(12) United States Patent
Chavez-Garcia et al.

(10) Patent No.: US 12,370,683 B2
(45) Date of Patent: *Jul. 29, 2025

(54) SYSTEM AND METHOD FOR HEALTH MONITORING OF A SANDING PAD DURING AN AUTONOMOUS FINISHING PROCESS

(71) Applicant: GrayMatter Robotics Inc., Gardena, CA (US)

(72) Inventors: Miguel A. Chavez-Garcia, Long Beach, CA (US); Yi-Wei Chen, Torrance, CA (US); Cheng Gong, Gardena, CA (US); Shreyash Gotee, Los Angeles, CA (US); Rishav Guha, Gardena, CA (US); Satyandra K. Gupta, Los Angeles, CA (US); Shreeya Jain, Redondo, CA (US); Ariyan M. Kabir, Los Angeles, CA (US); Ceasar G. Navarro, Los Angeles, CA (US); Husein M. Noble, Los Angeles, CA (US); Alessandra B. Palacios Puga, Long Beach, CA (US); Sagarkumar J. Panchal, Torrance, CA (US); Apoorva Patil, Los Angeles, CA (US); Pragadeeshkumar Rajavel, Long Beach, CA (US); Brual C. Shah, San Pedro, CA (US); Akshita Venkatachalam, Los Angeles, CA (US); Murilo M. Zelic, Long Beach, CA (US)

(73) Assignee: GrayMatter Robotics Inc., Gardena, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/916,376

(22) Filed: Oct. 15, 2024

(65) Prior Publication Data
US 2025/0033206 A1    Jan. 30, 2025

Related U.S. Application Data

(63) Continuation-in-part of application No. 18/379,114, filed on Oct. 11, 2023, now Pat. No. 12,257,712, and (Continued)

(51) Int. Cl.
*B24B 49/12* (2006.01)
*B24B 49/18* (2006.01)
(Continued)

(52) U.S. Cl.
CPC ............. *B25J 9/1653* (2013.01); *B24B 49/12* (2013.01); *B24B 49/186* (2013.01); *B24B 51/00* (2013.01);
(Continued)

(58) Field of Classification Search
CPC ........ B25J 9/1653; B25J 9/163; B25J 9/1664; B25J 9/1679; B25J 9/1697; B25J 11/0065;
(Continued)

(56) References Cited

U.S. PATENT DOCUMENTS 11,820,017 B1 * 11/2023 Chavez ................. B25J 13/085
2012/0220194 A1 * 8/2012 Maloney ................ B24B 37/30
451/5

(Continued)

FOREIGN PATENT DOCUMENTS

WO    WO-2023249903 A1 * 12/2023

*Primary Examiner* — Robert T Nguyen
(74) *Attorney, Agent, or Firm* — Run8 Patent Group, LLC; Peter Miller; Alexander Rodriguez

(57) ABSTRACT

A method includes: accessing a toolpath and processing parameters—including a target force and feed rate—as-
(Continued)

signed to a region of a workpiece; and accessing a wear model representing abrasive degradation of a sanding pad arranged on a sanding head. The method also includes, during a processing cycle: accessing force values output by a force sensor 199 coupled to the sanding head; navigating the sanding head across the workpiece region according to the toolpath and, based on the force values deviating the sanding head from the toolpath to maintain forces of the sanding head on the workpiece region proximal the target force; accessing contact characteristics representing contact between the sanding pad and the workpiece; estimating abrasive degradation of the sanding pad based on the wear model and the sequence of contact characteristics; and modifying the set of processing parameters based on the abrasive degradation.

19 Claims, 11 Drawing Sheets

Related U.S. Application Data a continuation-in-part of application No. 18/234,814, filed on Aug. 16, 2023, now abandoned, said application No. 18/379,114 is a continuation of application No. 18/136,241, filed on Apr. 18, 2023, now Pat. No. 11,820,017, which is a continuation-in-part of application No. 18/111,470, filed on Feb. 17, 2023, now Pat. No. 12,049,009, which is a continuation of application No. 17/829,193, filed on May 31, 2022, now Pat. No. 11,613,014, which is a continuation of application No. 17/826,840, filed on May 27, 2022, which is a continuation-in-part of application No. 17/390,885, filed on Jul. 31, 2021, now abandoned.

(60) Provisional application No. 63/431,634, filed on Dec. 9, 2022, provisional application No. 63/059,932, filed on Jul. 31, 2020.

(51) Int. Cl.
  *B24B 51/00* (2006.01)
  *B24D 9/08* (2006.01)
  *B25J 9/16* (2006.01)
  *B25J 11/00* (2006.01)
  *B25J 13/08* (2006.01)
  *G06T 1/00* (2006.01)
  *G06T 7/13* (2017.01)
  *G06T 7/60* (2017.01)
  *G06T 19/00* (2011.01)

(52) U.S. Cl.
  CPC .............. *B24D 9/085* (2013.01); *B25J 9/163* (2013.01); *B25J 9/1664* (2013.01); *B25J 9/1679* (2013.01); *B25J 9/1697* (2013.01); *B25J 11/0065* (2013.01); *B25J 13/085* (2013.01); *G06T 1/0014* (2013.01); *G06T 7/13* (2017.01); *G06T 7/60* (2013.01); *G06T 19/00* (2013.01); *G06T 2207/10024* (2013.01); *G06T 2219/004* (2013.01)

(58) Field of Classification Search
  CPC ...... B25J 13/085; B24B 51/00; G06T 1/0014; G06T 7/13; G06T 7/60; G06T 19/00; G06T 2207/10024; G06T 2219/004
  See application file for complete search history.

(56) References Cited

U.S. PATENT DOCUMENTS

2018/0283019 A1* 10/2018 Telleria .................... E04F 21/16
2024/0408723 A1* 12/2024 Dean, Jr. .................... B24C 9/00

* cited by examiner

SYSTEM AND METHOD FOR HEALTH MONITORING OF A SANDING PAD DURING AN AUTONOMOUS FINISHING PROCESS

CROSS-REFERENCE TO RELATED APPLICATIONS

This Application is a continuation-in-part application of U.S. patent application Ser. No. 18/379,114, filed on 11 Oct. 2023, which is a continuation application of U.S. patent application Ser. No. 18/136,241, filed on 18 Apr. 2023, which claims the benefit of U.S. Provisional Application No. 63/431,634, filed on 9 Dec. 2022, each of which is incorporated in its entirety by this reference.

Application Ser. No. 18/136,241 is a continuation-in-part of U.S. application Ser. No. 18/111,470, filed on 17 Feb. 2023, which is a continuation of U.S. application Ser. No. 17/829,193, filed on 31 May 2022, which is a continuation of U.S. application Ser. No. 17/826,840, filed on 27 May 2022, which is a continuation-in-part of U.S. application Ser. No. 17/390,885, filed on 31 Jul. 2021, which claims the benefit of U.S. Provisional Application No. 63/059,932, filed on 31 Jul. 2020, each of which is incorporated in its entirety by this reference.

This Application is also a continuation-in-part application of U.S. patent application Ser. No. 18/234,814, filed on 16 Aug. 2023, which is incorporated in its entirety by this reference.

TECHNICAL FIELD

This invention relates generally to the field of automated finishing and more specifically to a new and useful method for automated wear tracking and replacement triggering of a sanding pad in the field of automated finishing.

DESCRIPTION OF THE EMBODIMENTS

The following description of embodiments of the invention is not intended to limit the invention to these embodiments but rather to enable a person skilled in the art to make and use this invention. Variations, configurations, implementations, example implementations, and examples described herein are optional and are not exclusive to the variations, configurations, implementations, example implementations, and examples they describe. The invention described herein can include any and all permutations of these variations, configurations, implementations, example implementations, and examples.

1. Method: Sanding Pad Replacement

Figure 1:
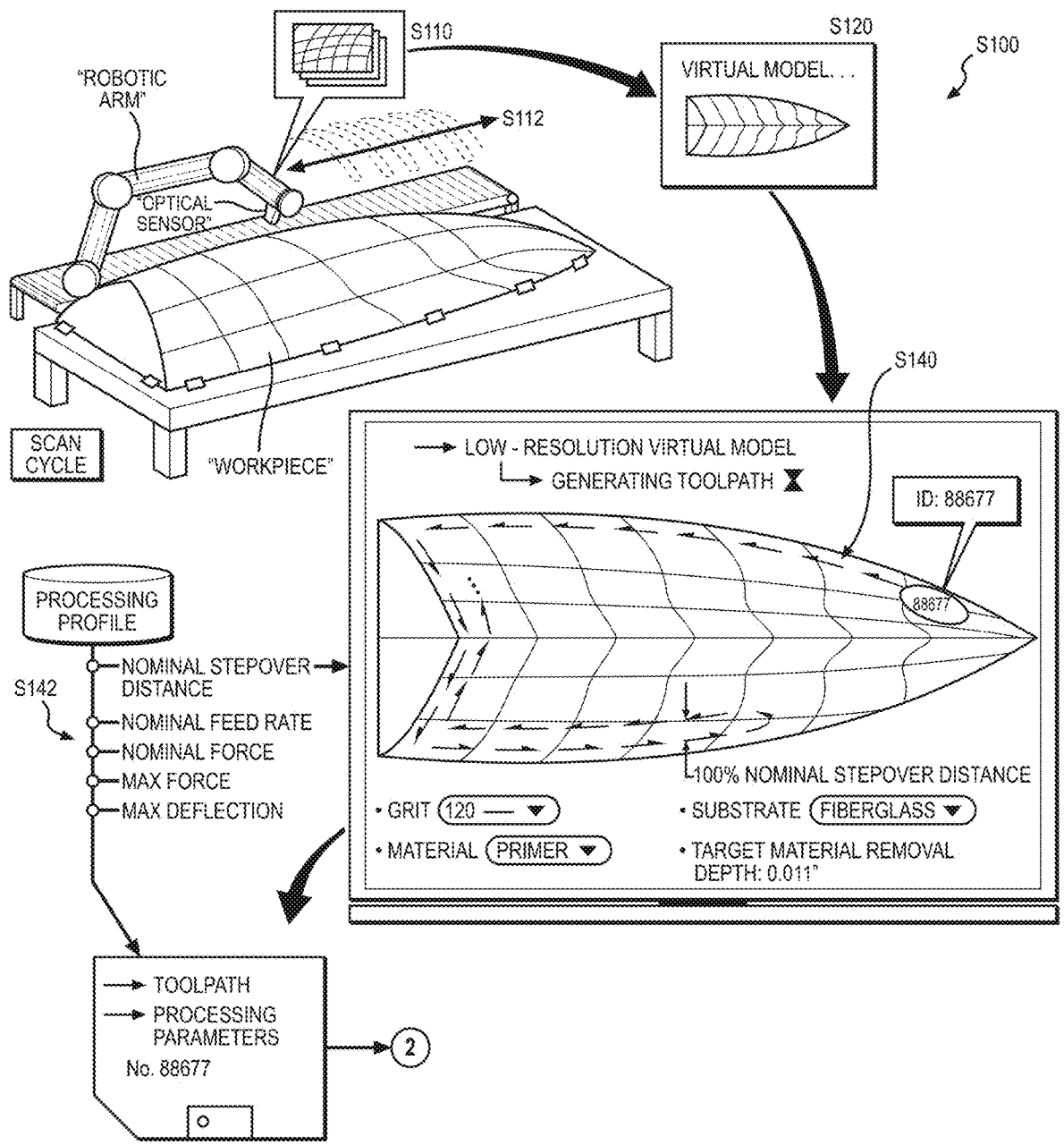
FIG. 1 is a flowchart representation of a method.
Figure 2:
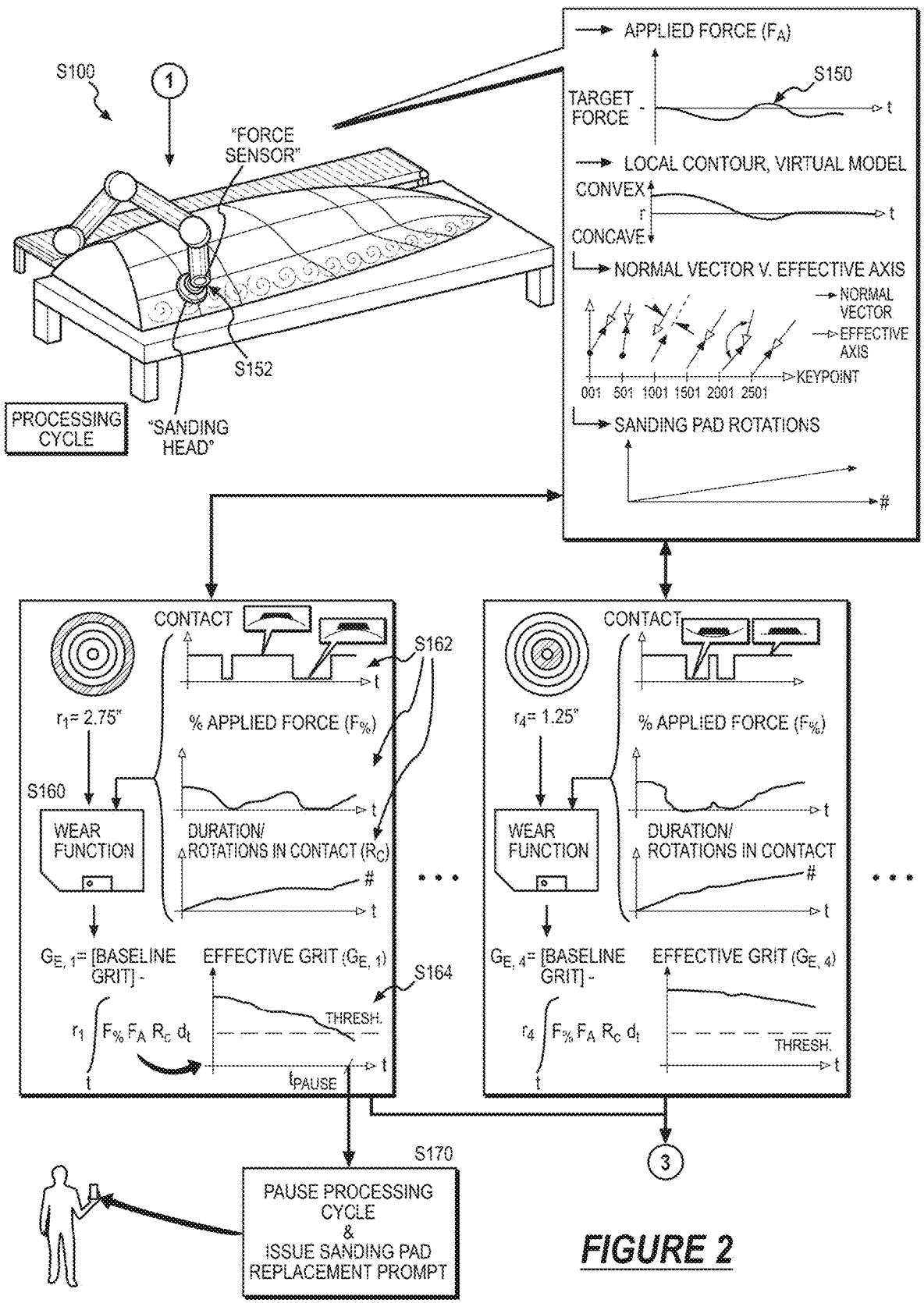
FIG. 2 is a schematic representation of the method.
Figure 3:
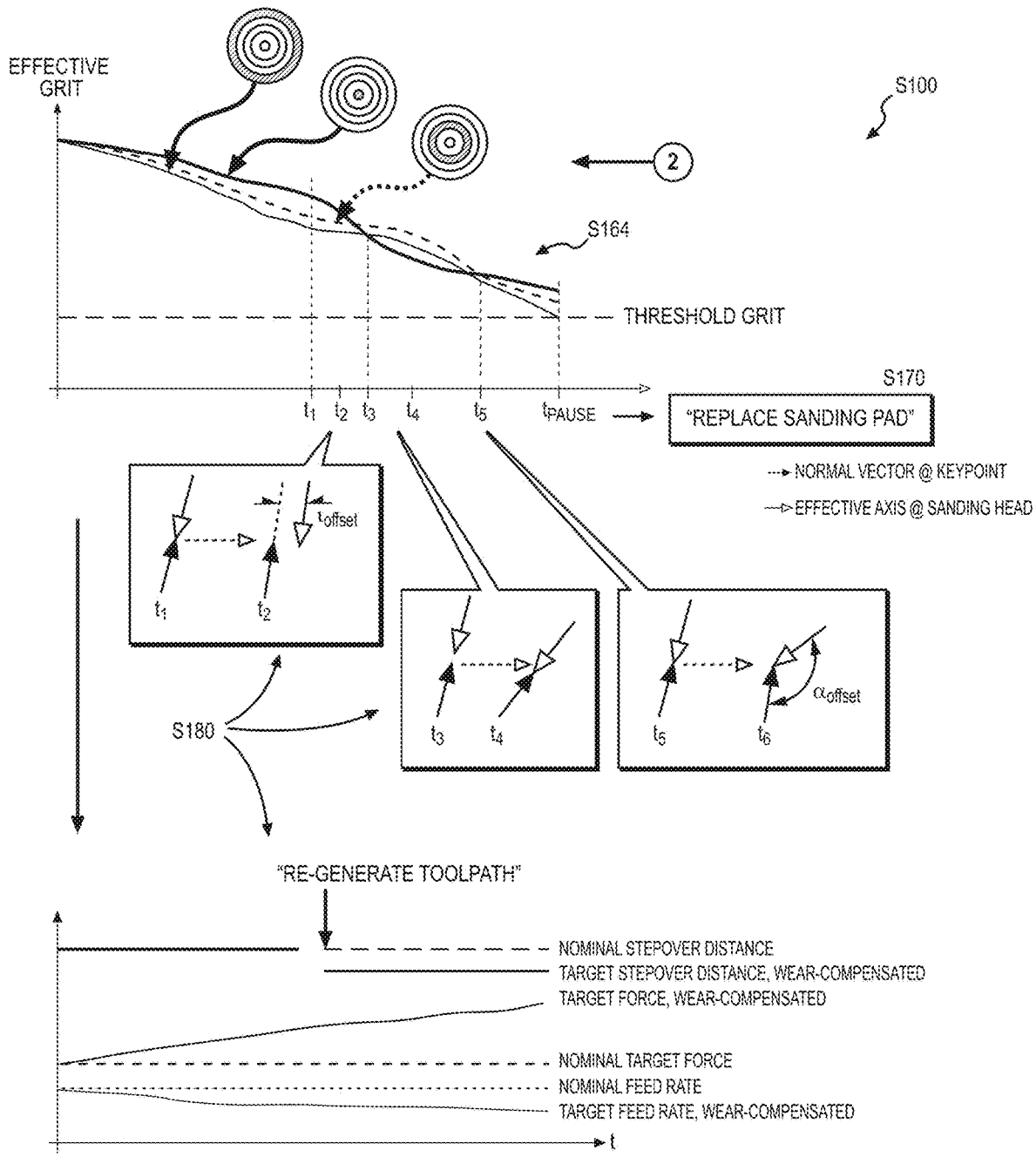
FIG. 3 is a schematic representation of the method.

As shown in FIGS. 1, 2, and 3, a method S100 includes: accessing a first toolpath for a first workpiece region of a workpiece in Block S140; accessing a first target force assigned to the workpiece in Block S142; and accessing a wear model representing abrasive degradation of a sanding pad 198 arranged on a sanding head 194 in Block S160.

The method S100 also includes, during a processing cycle: accessing a sequence of force values output by a force sensor 199 coupled to a sanding head 194 in Block S150; via a set of actuators coupled to the sanding head 194, navigating the sanding head 194 across the first workpiece region according to the first toolpath in Block S152 and, based on the sequence of force values, deviating the sanding head 194 from the first toolpath to maintain forces of the sanding head 194 on the first workpiece region proximal the first target force in Block S154; accessing a first sequence of contact characteristics representing contact between a first abrasive area on the sanding pad 198 and the workpiece in Block S162; estimating a first abrasive degradation of the first abrasive area based on the wear model and the first sequence of contact characteristics in Block S164; and, in response to the first abrasive degradation exceeding a threshold degradation, pausing the processing cycle for replacement of the sanding head 194 in Block S170.

1.1 Variation: Real-Time Processing Parameter Control

Another variation of the method S100 FIGS. 1, 2, and 3 includes: accessing a first toolpath for a first workpiece region of a workpiece in Block S140; accessing a first set of processing parameters assigned to the first workpiece region, the first set of processing parameters including a first target force and a first feed rate in Block S142; and accessing a wear model representing abrasive degradation of a sanding pad 198 arranged on a sanding head 194 in Block S160.

This variation of the method S100 also includes, during a processing cycle: accessing a sequence of force values output by a force sensor 199 coupled to a sanding head 194 in Block S150; via a set of actuators coupled to the sanding head 194, navigating the sanding head 194 across the first workpiece region according to the first toolpath in Block S152 and, based on the sequence of force values, deviating the sanding head 194 from the first toolpath to maintain forces of the sanding head 194—on the first workpiece region—proximal the first target force in Block S154; accessing a first sequence of contact characteristics representing contact between a first abrasive area on the sanding pad 198 and the workpiece in Block S160; estimating a first abrasive degradation of the first abrasive area based on the wear model and the first sequence of contact characteristics in Block S164; and modifying the first set of processing parameters based on the first abrasive degradation in Block S180.

1.2 System: Tool Changer

Figure 5:
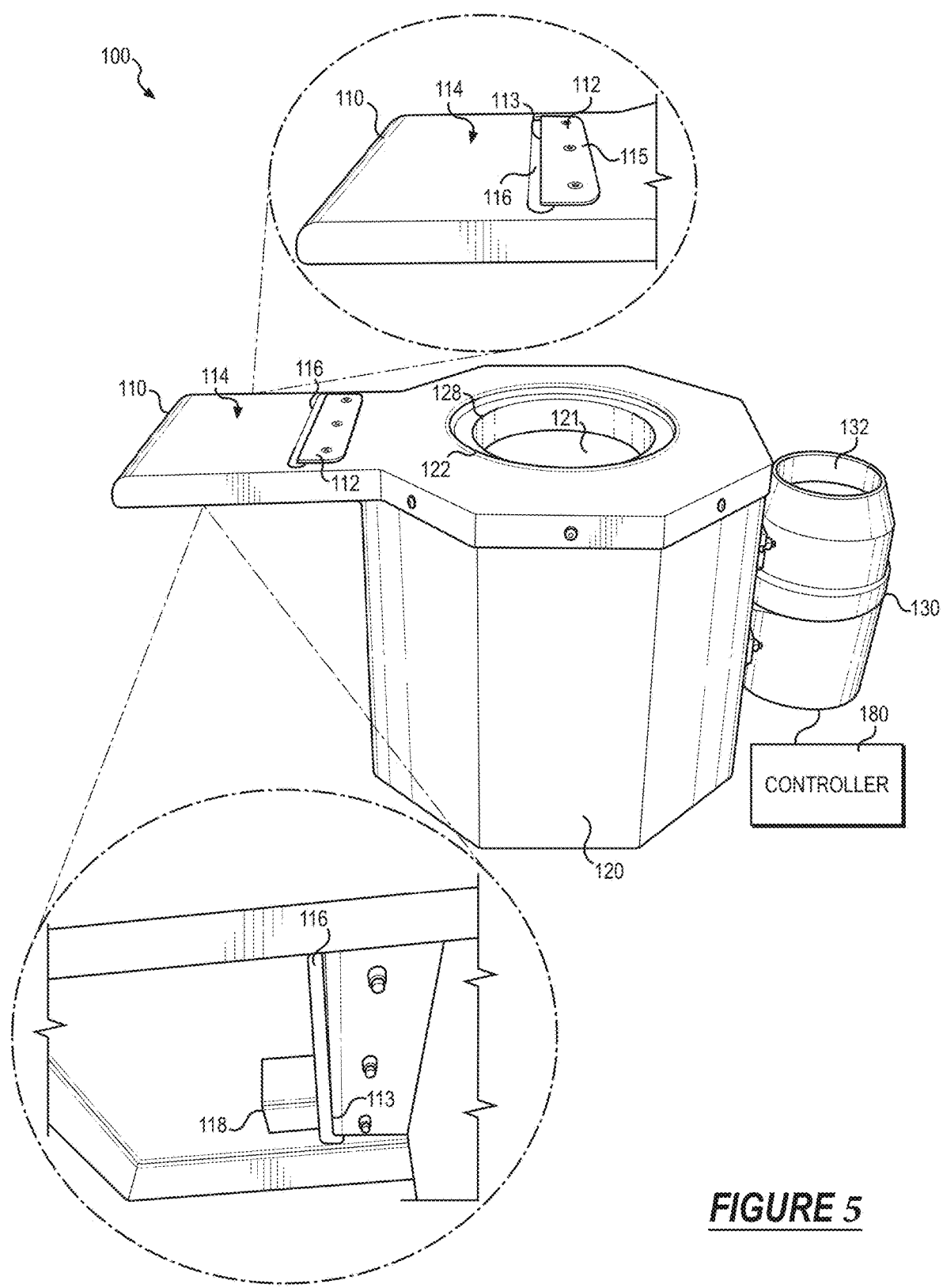
FIG. 5 is a schematic representation of a system.
Figure 6:
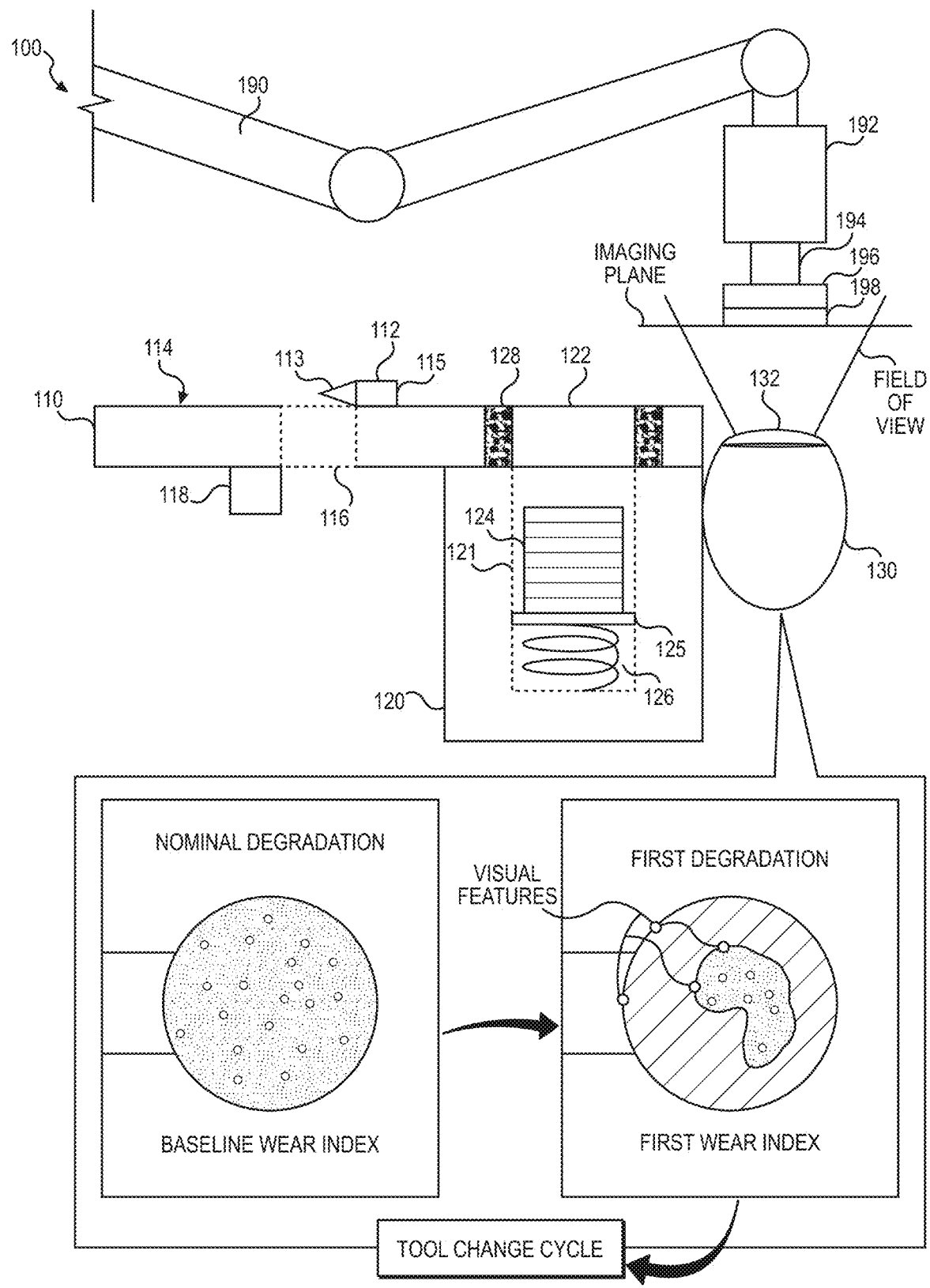
FIG. 6 is a schematic representation of the system.
Figure 7:
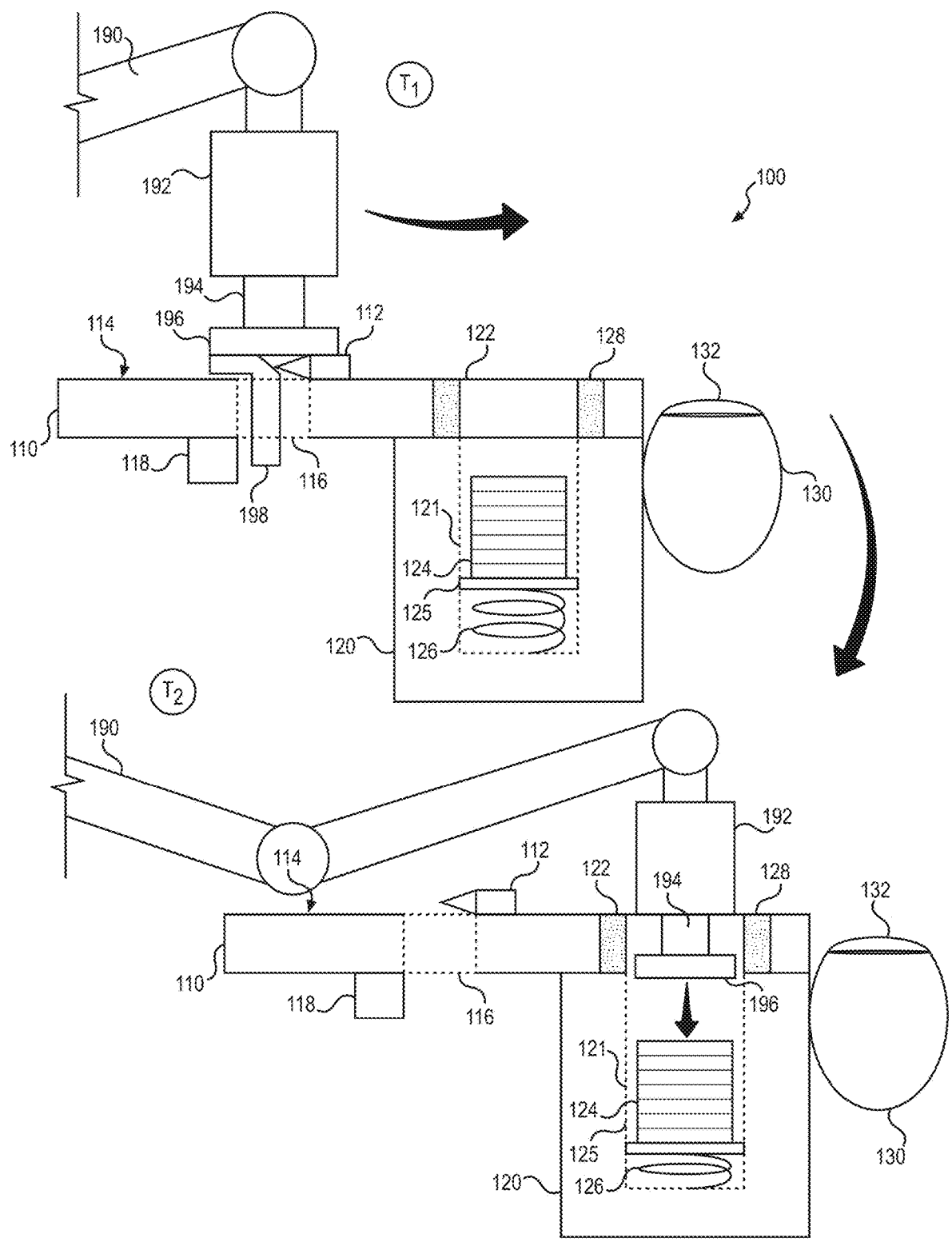
FIG. 7 is a schematic representation of the system.
Figure 8:
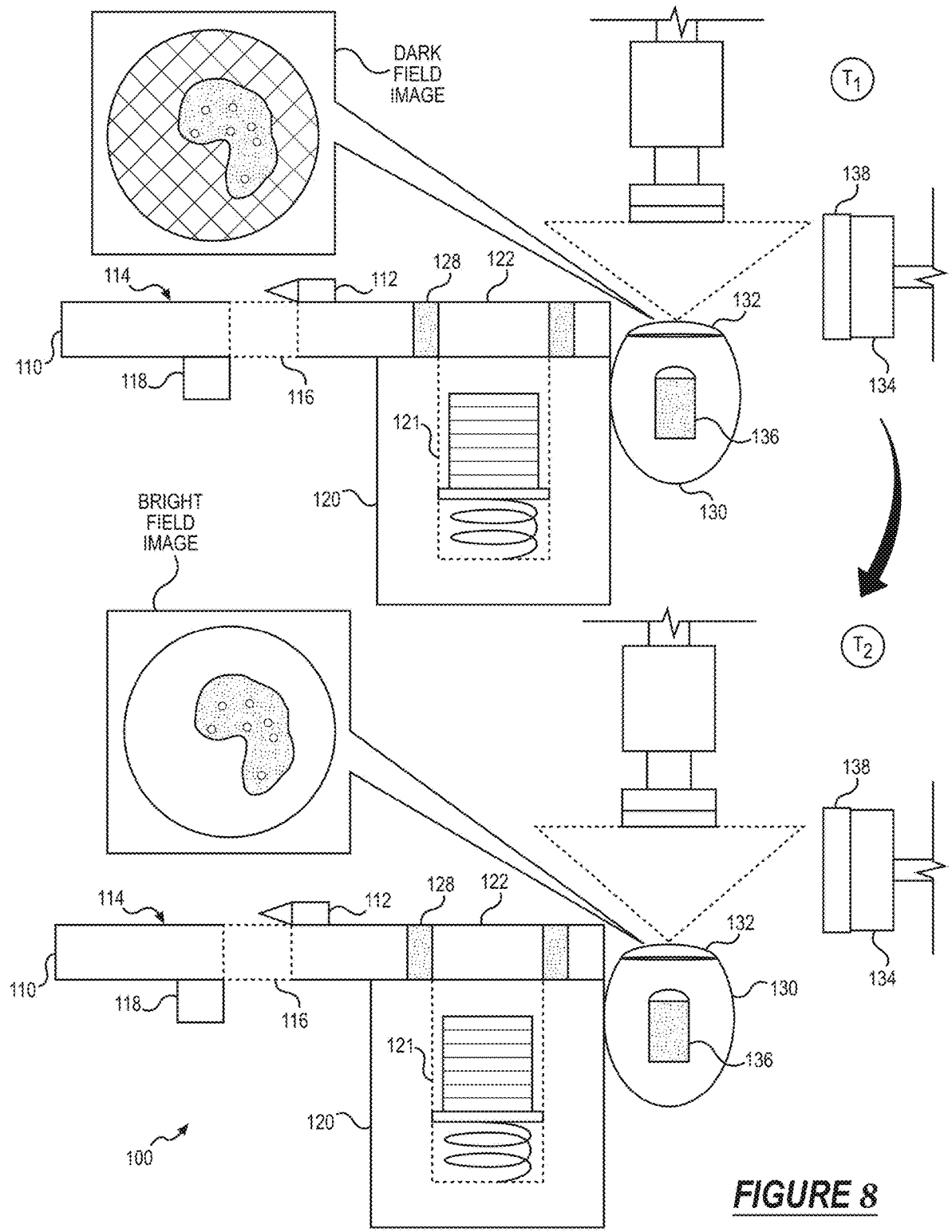
FIG. 8 is a schematic representation of the system.
Figure 9:
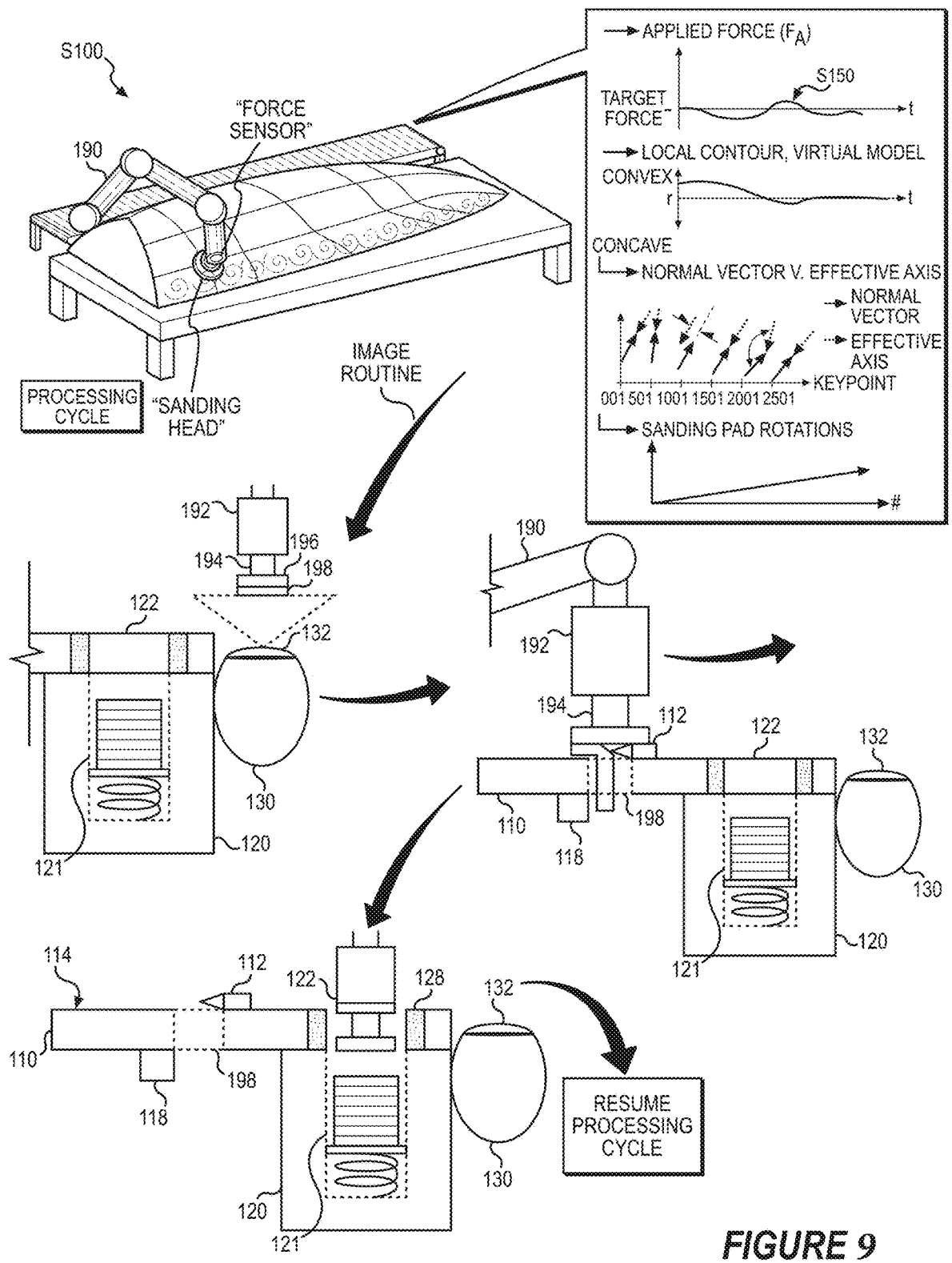
FIG. 9 is a schematic representation of the system.
Figure 10:
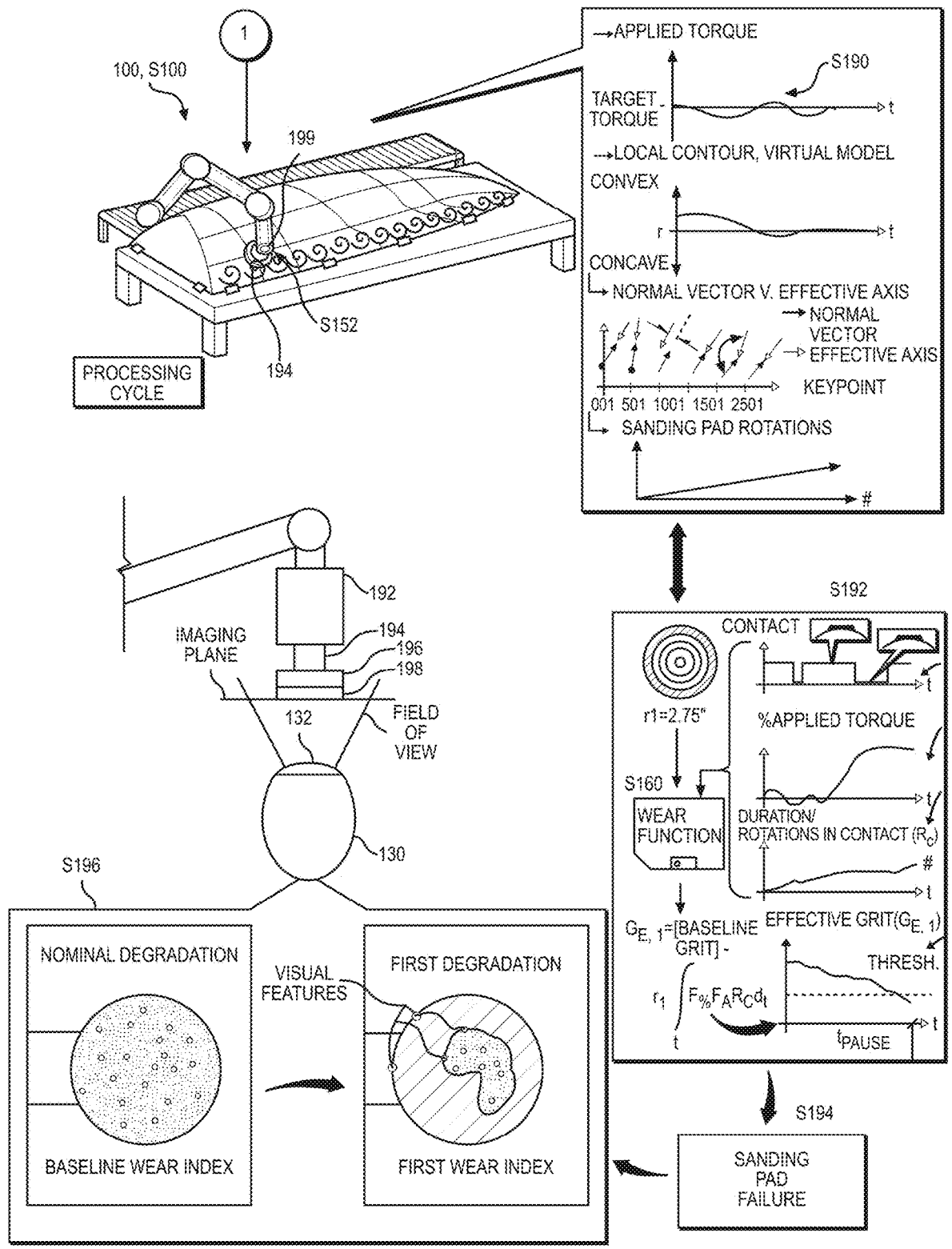
FIG. 10 is a flowchart representation of the method.
Figure 11:
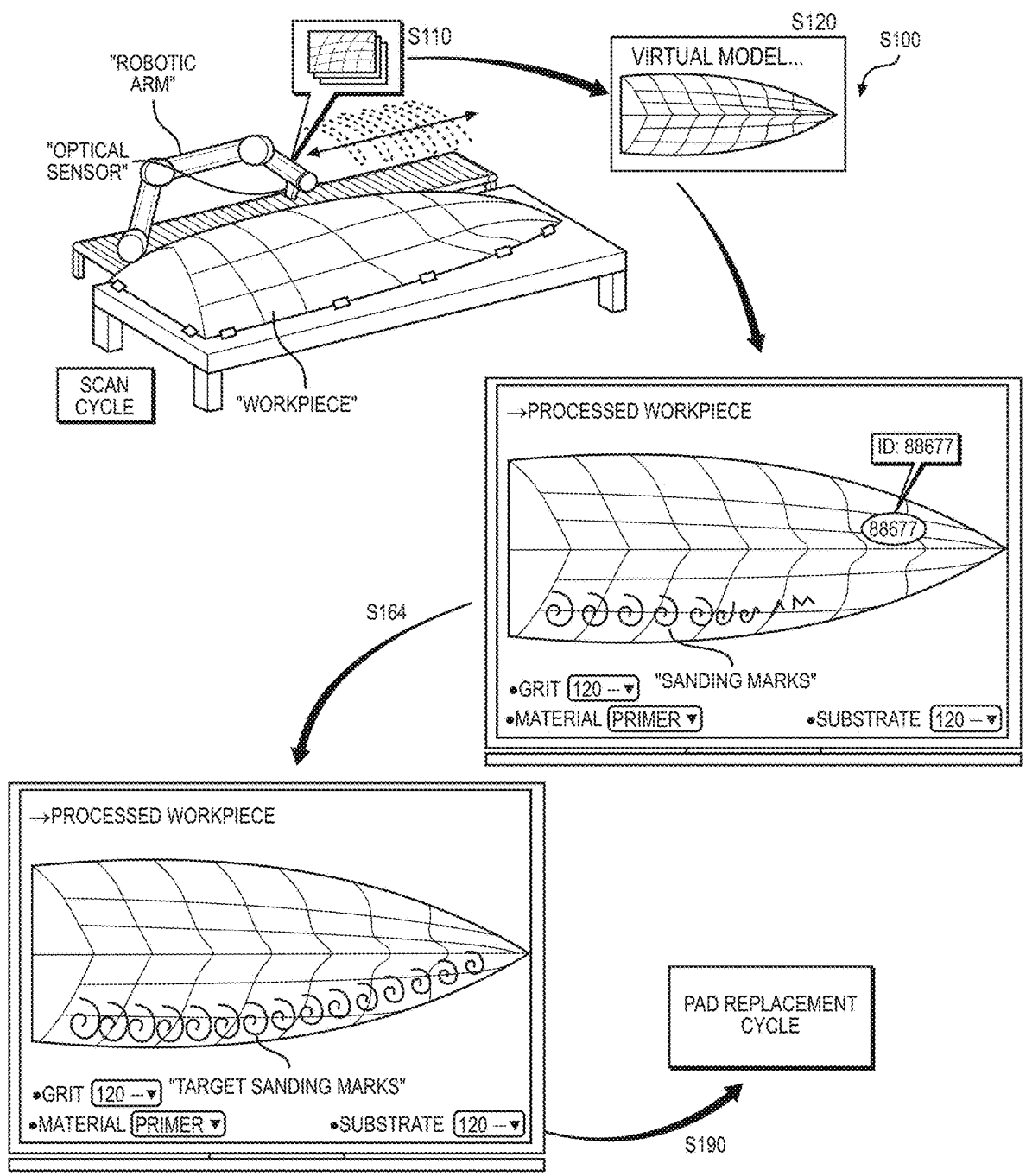
FIG. 11 is a flowchart representation of the method.

As shown in FIGS. 5, 6, and 7, a system 100 for changing a sanding pad 198 at a sanding head 194 includes: a pad removal assembly 110; a replacement pad reservoir 120; a first inspection unit 130; and a controller 180.

The pad removal assembly no includes: a waste receptable; a slot 116 arranged over the waste receptable; a guide surface 114 adjacent the slot 116 and configured to guide a sanding pad arranged on a sanding head 194, toward the slot 116; and a separating element 112 (e.g., a blade) facing the slot 116 opposite the guide surface 114, configured to separate the sanding pad from the sanding head during autonomous traversal of the sanding head across the guide surface 114, and configured to guide the sanding pad into the waste receptable.

The replacement pad reservoir 120, arranged adjacent the separating element 112: houses a set (e.g., a stack) of sanding pads 124 configured to couple the sanding head 194 (e.g., via a hook-and-loop interface or a pressure-sensitive adhesive); and includes an aperture 122 proximal (e.g., in plane with) the guide surface 114 and configured to receive the sanding head autonomously navigated into the reservoir toward the set of sanding pads.

The first inspection unit 130 includes an optical sensor 132 defining a field of view and configured to capture images of the sanding pad 198 arranged on the sanding head 194.

The controller 180 is configured to: trigger a set of actuators coupled to the sanding head to navigate the sanding head into the field of view of the optical sensor 113; access a first image recorded by the optical sensor 132 and depicting a first abrasive area of a first sanding pad 198 arranged on the sanding head occupying the field of view of the optical sensor 132; extract a first set of visual features from the first image; and interpret a first abrasive degradation for the first abrasive area in the first image based on the first set of features.

The controller 180 is also configured to, in response to the first abrasive degradation exceeding a threshold degradation, trigger a tool change cycle to: navigate the sanding head 194 across the guide surface 114 toward the separating element 112 to remove the first sanding pad 198 from the sanding head 194; and navigate the sanding head 194 within the replacement pad reservoir 120 to engage a second sanding pad 198, in the set of sanding pads 124, within the replacement pad reservoir 120 at the sanding head 194.

2. Applications

Generally, an autonomous scanning and sanding system 100 (hereinafter the "system 100") can execute Blocks of the method S100: to autonomously capture scan data of a workpiece occupying a work cell during a rapid, contactless scan cycle; to compile these scan data into a virtual three-dimensional model of the workpiece; to generate a toolpath spanning surfaces represented in the virtual model and defining a sequence of nominal positions and orientations traversable by a sanding head 194 to sand (hereinafter "process") the workpiece; and to assign a target force for application of the sanding head 194 on the workpiece.

The system 100 can further execute Blocks of the method S100 during a processing cycle: to track forces applied by the sanding head 194 to the workpiece; and to advance and retract the sanding head 194 normal to the workpiece while navigating the sanding head 194 along the toolpath to maintain forces applied by the sanding head 194 to the workpiece at the target force, thereby achieving predictable material removal across the workpiece and a consistent surface finish across the workpiece.

The system 100 also executes Blocks of the method S100 to monitor contact characteristics between a sanding pad 198 and the workpiece during the processing cycle, such as: applied force across the whole sanding pad or discrete areas (e.g., nested annular rings) on the sanding pad 198; rotations of the whole sanding pad or individual areas of the sanding pad 198 while in contact with the workpiece; durations of time that the whole sanding pad or individual areas of the sanding pad 198 are in contact with the workpiece; distance traversed by the whole sanding pad or by individual areas of the sanding pad 198 area while in contact with the workpiece; and/or feed rate of the whole sanding pad or individual areas of the sanding pad 198 moving across the workpiece while in contact with the workpiece.

The system 100 can further maintain an estimate of effective abrasiveness (or "grit") of the whole sanding pad or individual areas of the sanding pad 198 during the processing cycle based on these contact characteristics and a wear function, such as: an initial baseline abrasiveness of the sanding pad 198 (e.g., "80 grit," "220 grit") less an integral of applied force and estimated count of rotations of the sanding pad 198 in contact with the workpiece; or an initial baseline abrasiveness of the sanding pad 198 less a combination of applied force and distance traversed, integrated over a workpiece contact duration, for each individual area of the sanding pad 198.

The system 100 can then modify processing parameters for the workpiece in real-time during the processing cycle based on effective abrasiveness of the whole sanding pad or individual areas, such as by decreasing feed rate, increasing target applied force, and/or decreasing stepover distance between legs of the toolpath proportional to reduction in effective abrasiveness of the sanding pad 198.

Additionally or alternatively, the system 100 can tilt (e.g., "pitch," "roll") the sanding head 194 relative to the workpiece (e.g., relative to a vector normal to an adjacent local region of the workpiece) to move different annular areas of the sanding pad 198 exhibiting greater effective abrasiveness into (primary) contact with the convex region of the workpiece and thus maintain a more consistent effective abrasiveness across the entire sanding pad during the processing cycle. Similarly, the system 100 can linearly offset a rotational axis of the sanding head 194 relative to a vector normal to an adjacent local region of the workpiece to move different annular areas of the sanding pad 198 exhibiting greater effective abrasiveness into (primary) contact with the workpiece and thus maintain a more consistent effective abrasiveness across the entire sanding pad during the processing cycle. For example, the system 100 can implement this process to linearly and/or angularly offset the rotational axis of the sanding head 194 from normal vectors through a local convex region of the workpiece in order to focus wear to inner annuli of the sanding pad 198. The system 100 can then return the rotational axis of the sanding head 194 to coaxial with normal vectors through a local concave region of the workpiece in which the outer annuli of the sanding pad 198—now with high effective abrasiveness than the inner annuli—predominantly or solely contact the workpiece.

Furthermore, in response to the effective abrasiveness of the whole sanding pad or individual areas of the sanding pad 198 falling below a threshold abrasiveness, the system 100 can: pause the processing cycle; generate a prompt, command, or other notification to replace the sanding pad 198 on the sanding head 194; and serve this prompt to a human operator for completion or to an automatic tool changer for replacement of the sanding pad 198.

Figure 4:
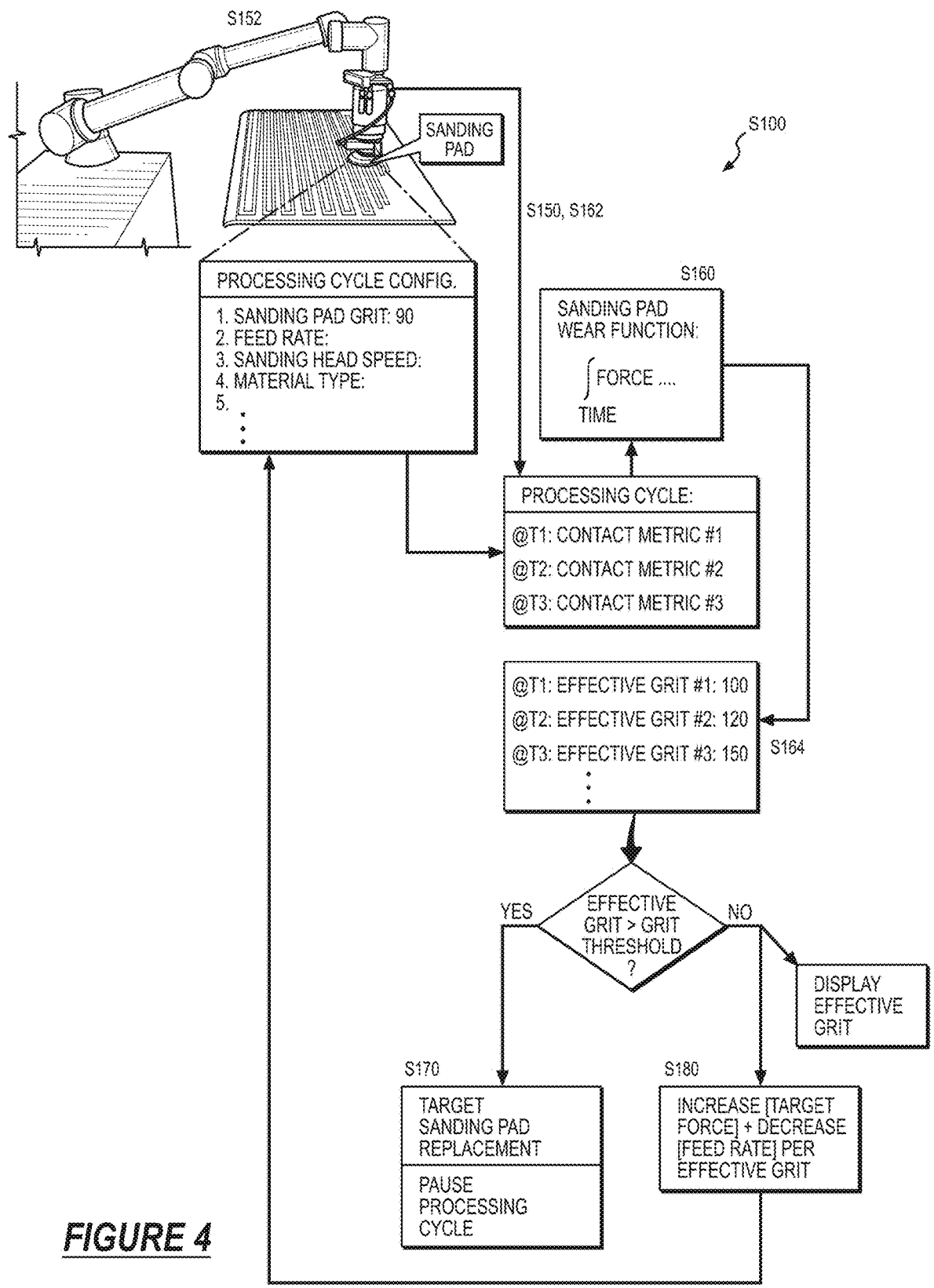
FIG. 4 is a schematic representation of the method.

Therefore, the system 100 can execute Blocks of the method S100 to: track wear of a sanding pad 198 during a processing cycle while processing (i.e., "sanding") a workpiece; estimate effective abrasiveness of the sanding pad 198 based on this wear; autonomously modify processing parameters for the workpiece in real-time during the processing cycle based on this effective abrasiveness to achieve more consistent wear across the sanding pad 198, more consistent material removal with the sanding pad 198, and more consistent surface finish across the workpiece; and selectively pause the processing cycle for replacement of the sanding pad 198 based on this effective abrasiveness (e.g., when replacement of the degraded sanding pad with an unused sanding pad may yield faster, more efficient, and/or more consistent material removal and surface finish on the workpiece), as shown in FIG. 4.

Furthermore, the method is described herein as executed by the system 100 to track and manage wear of a sanding pad 198 arranged on a rotary sanding head 194. The system 100 can also implement these methods and techniques to track and manage wear of a sanding pad 198 arranged on an orbital or random-orbital sanding head 194, which may yield sanding pad wear that approximates sanding pad wear on a rotary sanding head 194 or that yields average wear over a sanding pad 198 area that approximate sanding pad wear on a rotary sanding head 194. The system 100 can also implement these methods and techniques to track and manage wear of sanding pad arranged on an oscillating or other type of sanding head 194.

2.1 Example

In one implementation, prior to or during the processing cycle, the system 100 can interface with a human operator to set the sanding pad 198 wear threshold for the processing cycle, such as: 100% to minimize material consumption; 90% to balance material removal rate and material consumption; 80% for faster material rate and system 100 efficiency; or 75% for maximum material rate, maximum system 100 efficiency, maximum output surface finish consistency.

During the processing cycle, the system 100 can monitor abrasive degradation (or "wear percentage," "wear level") of the sanding pad 198 while autonomously navigating the sanding pad 198 and sanding head 194 across the workpiece. For example, the system 100 can estimate abrasive degradation of the sanding pad 198 based on: a wear function (or "wear model") associated with a type of sanding pad and/or baseline abrasiveness of the sanding pad 198; a speed rate (i.e., rotation rate) of the sanding head 194, a feed rate of the sanding head 194 across the workpiece, an applied force of the sanding head 194 on the workpiece, contact areas of the sanding pad 198 on the workpiece during a processing cycle); and/or characteristics of the workpiece (e.g., surface material type, hardness, abrasive loading tendency).

For example, upon installation of a new sanding pad onto the sanding head 194, the system 100 can: reset a stored abrasive degradation for the sanding pad 198 to "0%"; and retrieve characteristics (e.g., a material type, hardness, abrasive loading tendency) of a target surface on the workpiece. While navigating the sanding pad 198 across the target surface over a subsequent processing cycle, the system 100 can: monitor contact characteristics (e.g., applied force, rotation count, rotation speed, feed rate) representing characteristics of contact between the sanding pad 198 and the workpiece; and insert these contact characteristics and characteristics of the target surface into a wear function for the sanding pad 198 to calculate abrasive degradation of the sanding pad 198.

In this example, in response to the abrasive degradation of the sanding pad 198 falling below a threshold degradation (i.e., exceeding a maximum degradation, exceeding a minimum effective abrasiveness), the system 100 can continue to execute the processing cycle with the current sanding pad.

The system 100 can continue to recalculate the abrasive degradation of the sanding pad 198 during the processing cycle. Then, in response to the abrasive degradation of the sanding pad 198 exceeding a wear threshold (e.g., 75%), the system 100 can: pause the processing cycle; generate a notification to replace the sanding pad 198; and serve this notification to an operator. For example, the system 100 can generate the notification to replace the used sanding pad with a second sanding pad of the same initial or baseline abrasiveness, such as if the system 100 has not yet achieved a target output surface finish across the entire workpiece at a current abrasiveness level. In another example, the system 100 can generate the notification to replace the sanding pad 198 with a sanding pad 198 of a succeeding (e.g., lesser) initial abrasiveness if the system 100 has achieved the target output surface finish (e.g., coating thickness, surface roughness) at the current abrasiveness level. The system 100 can then resume the processing cycle following replacement of the sanding pad 198.

In one variation, the system 100 can trigger automatic replacement of the first sanding pad with a second sanding pad responsive to abrasive degradation of the current sanding pad exceeding the wear threshold.

In another variation, the system 100 can dynamically adjust processing parameters for the workpiece (e.g., speed rate of the sanding pad 198, feed rate of the sanding head 194, force applied by sanding pad to the workpiece), such as to reduce degradation rate of the sanding pad 198, maintain or increase material removal rate from the workpiece by the sanding pad 198, and/or improve surface finish consistency across the workpiece.

2.2 Applications: Tool Changer

Generally, the system 100 functions as a tool changer for a sanding pad 198 transiently coupled to a sanding head 194 following application of the sanding head 194 on a work piece to: derive an abrasive degradation across surfaces of a worn sanding pad 198 transiently coupled to the sanding head 194; autonomously separate the worn sanding pad 198 from the sanding head 194 in response to the abrasive degradation exceeding a threshold degradation; and autonomously couple a mint (or "new") sanding pad 198 at the sanding head 194 following separation of the worn sanding pad 198 from the sanding head 194.

In particular, the system 100 includes: an optical sensor 132 (e.g., color camera, depth sensor) defining a field of view and configured to capture an image of the worn sanding pad 198 arranged on the sanding head 194; a pad removal assembly 110 including a guide surface 114 arranged proximal a separating element 112 (e.g., blade) configured to guide the sanding head 194 toward a separating element 112 to remove the worn sanding pad 198 from the sanding head 194; and a replacement pad reservoir 120 arranged adjacent the pad removal assembly no and defining an interior cavity configured to contain a set of sanding pads 124 (e.g., a stack of sanding pads). Additionally, the system 100 cooperates with a robotic arm 190: arranged proximal a work area including the work piece; and including an end effector 192 arranged on a distal end of the robotic arm 190 and the sanding head 194 coupled to the end effector 192 configured to actuate the sanding pad 198.

In one example, following a target time window (e.g., 30 minutes) during a processing cycle corresponding to application of the sanding head 194 at a work piece, the system 100 can: pause application of the sanding head 194 at the work piece; navigate, such as via actuators at the robotic arm 190, the sanding head 194 proximal the optical sensor 132 to locate the worn sanding pad 198 at the sanding head 194 within a field of view of the optical sensor 132; and trigger the optical sensor 132 to capture a first image depicting an abrasive area across the worn sanding pad 198 arranged on the sanding head 194 (sanding head 194). The system 100 can then: implement computer vision techniques (e.g., deep learning) to extract a set of visual features from the first image; and interpret the abrasiveness across the abrasive area of the worn sanding pad 198 based on the set of visual features from the first image.

More specifically, the system 100 can: transform the set of visual features (e.g., pixels) from the first image into an wear index representing a degree of wear across the worn sanding pad 198 at the sanding head 194; and, in response to the wear index exceeding a threshold deviation from a nominal wear map representing a baseline degree of wear for a mint (or "new") sanding pad 198 arranged on the sanding head 194, execute the tool change cycle to replace the worn sanding pad 198 at the sanding head 194 with a mint sanding pad 198 from the replacement pad reservoir 120.

Accordingly, during the tool change cycle, the system 100 can then: navigate the sanding head 194—including the worn sanding pad 198—in abutting engagement to the guide surface 114 of the pad removal assembly 110; and maneuver the sanding head 194 along a linear path to engage the worn sanding pad 198 at the sanding head 194 along a cutting edge 113 of the separating element 112, thereby removing the worn sanding pad 198 (e.g., worn sanding pad 198) from the sanding head 194. Additionally, the system 100 can then: locate the sanding head 194 over an aperture 122 of the replacement pad reservoir 120 defining a passageway toward the interior cavity containing the set of sanding pads 124 (e.g., set of sanding pads); and maneuver the sanding head 194 within the interior cavity of the replacement pad reservoir 120 to concentrically align the sanding head 194 with the set of sanding pads 124 within the interior cavity and apply a target force to induce coupling (e.g., via hook and loop fasteners) between an interface pad 196 at the sanding head 194 and a first sanding pad 198, in a set of sanding pads 124, arranged within the interior cavity.

Therefore, during a processing cycle corresponding to application of a sanding head 194 at a work piece, the system 100 can: routinely (e.g., every 30 minutes) derive an abrasive degradation for a worn sanding pad 198 at the sanding head 194; and replace the worn sanding pad 198 at the sanding head 194 with a mint (or "new") sanding pad 198, thereby maintaining target performance of application of the sanding head 194 at the work piece during the processing cycle.

3. System

In one implementation described in U.S. patent application Ser. No. 18/111,470 and shown in FIGS. 1 and 4, the system 100 includes: a robotic arm 190 arranged in or adjacent a work zone and that includes a set of articulatable joints interposed between a series of arm segments; an end effector 192 supported on a distal end of the robotic arm 190; a sanding head 194 arranged on or integrated into the end effector 192 and configured to actuate (e.g., rotate) a sanding pad 198; an optical sensor 132 (e.g., a set of depth sensors and/or color cameras) arranged on or integrated into the end effector 192 and configured to capture optical images (e.g., depth maps, photographic color images) of a workpiece; a force sensor 199 (e.g., a one-dimensional axial force sensor 199) configured to output a signal representing a force applied by the sanding head 194 to a workpiece normal to the sanding head 194; a set of position sensors configured to output signals representing (or assemblable into) a three-dimensional position of the end effector 192; a display configured to render a user interface accessible by an operator; and/or a controller 180 configured to execute Blocks of the method S100.

In this implementation, the system 100 can also include a conveyor configured to traverse the robotic arm 190 longitudinally along the work zone, such as to reach and process an elongated part defining a high length-to-width ratio (e.g., a high aspect ratio), such as a boat hull or aircraft wing.

In another implementation, the system 100 includes a multi-axis (e.g., five-axis) gantry configured to locate and articulate the end effector 192, sanding head 194, and optical sensor 132(s) across the work zone.

However, the system 100 can include or define any other element or structure.

3.1 System: Tool Changer

Generally, the system 100 includes a pad removal assembly no, a replacement pad reservoir 120, and an inspection unit 130 forming a tool changer that cooperates with a robotic arm 190, as described above, to: autonomously separate a particular sanding pad 198 coupled to a sanding head 194 arranged on an end effector 192 of the robotic arm 190 at the pad removal assembly no; and autonomously load a mint (or "new") sanding pad 198 at the sanding head 194 by navigating the sanding head 194 within an interior of the replacement pad reservoir 120 containing a set of sanding pads 124 (e.g., a stack of sanding pads). In particular, the system 100 can: retrieve an image from an optical sensor 132 at the inspection unit 130 depicting an abrasive area of a sanding pad 198; and interpret an abrasive degradation for the abrasive area of the sanding pad 198 based on visual features extracted from the image. Thus, the system 100 can then: navigate the sanding head 194 across the pad removal assembly 110 to remove a worn sanding pad 198 from the sanding head 194; and navigate the sanding head 194 within the replacement pad reservoir 120 to couple a mint (or "new") sanding pad 198 arranged within the replacement pad reservoir 120.

2.2 Pad Removal Assembly

In one implementation, the system 100 includes a pad removal assembly 110 including: a separating element 112 (e.g., blade) configured to receive the sanding pad 198 arranged on a sanding head 194; and a guide surface 114 arranged proximal the separating element 112 and configured to guide the sanding head 194 toward the separating element 112. In particular the system 100 can: trigger the robotic arm 190, such as in response to receiving a tool changing instruction from an operator, to maneuver the sanding head 194 across the pad removal assembly 110 in order to remove a current sanding pad 198 coupled to the sanding head 194; and maintain abutting engagement between the guide surface 114 and the sanding head 194 while the sanding head 194 traverses toward the separating element 112 (e.g., blade) to separate a sanding pad 198 coupled to the sanding head 194.

In this implementation, the guide surface 114: defines a rectangular region formed of a unitary metallic material (e.g., aluminum) proximal the separating element 112; and is configured to receive the sanding head 194 in abutting engagement with the guide surface 114. For example, the guide surface 114 can include an abrasion resistance coating (e.g., ceramic coating) configured to reduce wear resulting from abutting engagement of the separating element 112 against the guide surface 114 during removal of the sanding pad 198 coupled to the sanding head 194.

Additionally, the pad removal assembly no includes a slot 116: extending across a first lateral side of the guide surface 114 to define a lateral channel interposed between the guide surface 114 and the separating element 112; and defines a first edge proximal the guide surface 114 and a second edge, opposite the first edge, proximal the separating element 112. Accordingly, the separating element 112 can include a blade including: a spine 115 coupled proximal the second edge of the slot 116; and a cutting edge 113, arranged opposite the spine 115, partially extending across the channel and configured to receive the sanding pad 198 of a sanding head 194 and guide the sanding pad 198 within the slot 116 during separation of the sanding pad 198 from the sanding head 194.

In this implementation, the separating element 112 can be coupled to the second edge of the slot 116 via a set of threaded fasteners configured to maintain the separating element 112 at a target height above the guide surface 114. Accordingly, the set of threaded fasteners can be modified (e.g., turned clock wise, counter clock wise) to adjust the target height (e.g., increase height, decrease height) between the separating element 112 and the sanding pad 198 to accommodate varying sizes and dimensions of sanding pads coupled to the sanding head 194. Additionally, the separating element 112 includes fasteners configured to locate the separating element 112 to a target height in order to accommodate a gap for the sand disc backing thickness to achieve optimal detachment of the sanding pad from the interface pad.

In one example, during a tool change cycle, the system 100 can: locate (e.g., by maneuvering the end effector 192) the sanding head 194 including a sanding pad 198 in abutting engagement with the guide surface 114; and maneuver the sanding head 194 along a linear path toward the separating element 112 while maintaining abutting engagement between the sanding head 194 and the guide surface 114. In this example, as the sanding head 194 engages the separating element 112: the cutting edge 113 of the blade slices between the interface pad 196 arranged on the sanding head 194 and the sanding pad 198 coupled to the interface pad 196 (e.g., via hook and loop fastener connection); and the sanding pad 198 is guided through the slot 116 as the blade separates the sanding pad 198 from the interface pad 196 (e.g., coupled via hook and loop fastener connection) at the sanding head 194, thereby separating the sanding pad 198 from the sanding head 194. In this example, the system 100 can also include a waste receptacle: arranged below the slot 116 of the pad removal assembly 110; and configured to retain the worn sanding pads dispensed from the slot 116 of the pad removal assembly 110. An operator can thus, routinely dispose of the worn sanding pads within the waste receptacle to accommodate continued operation of the pad removal assembly no.

In the aforementioned implementation, the system 100 can also include a deflector pad 118: arranged proximal the first edge of the slot 116 and below the guide surface 114; defining a vertical plane arranged normal to the guide surface 114; and configured to maintain the first sanding pad 198 in a target vertical pose through the slot 116 during separation of the first sanding pad 198 from the sanding head 194. Thus, the system 100 can repeatedly dispense worn sanding pads from the slot 116 in a target vertical pose to prevent contact of the abrasive surface of the worn sanding pads against components of the pad removal assembly 110 and/or the replacement pad reservoir 120. The deflector pad 118 is arranged below the separating blade 112 configured to guide the sanding pads removed from the sanding head 194 downward towards the waste receptacle to prevent crashing (or "interference") between the sanding pad 192 and the separating element fasteners and the replacement pad reservoir 120.

Therefore, the system 100 can execute tool change cycles to: maneuver a sanding head 194 including a sanding pad 198 across the pad removal assembly 110 to separate the sanding pad 198 from the sanding head 194; and repeatedly dispense the worn sanding pads from the slot 116 at the pad removal assembly 110 to prevent contact of the worn sanding pads against components of the system 100.

3.4 Reservoir

In one implementation, the system 100 includes a replacement pad reservoir 120: arranged adjacent the pad removal assembly no; defining a cylindrical volume configured to store a set of sanding pads, such as a vertical stack of the sanding pads arranged within an interior cavity of the replacement pad reservoir; and including an aperture 122 arranged on a first end of the replacement pad reservoir forming a passageway into the interior cavity of the replacement pad reservoir including the set of sanding pads. In particular, the system 100 can include: the replacement pad reservoir 120 and the pad removal assembly no forming a unitary structure; and the aperture 122 of the replacement pad reservoir arranged adjacent the separating element 112 of the pad removal assembly no. In this implementation, the guide surface 114: defines a planar region that extends across the top end of the replacement pad reservoir 120 and includes the aperture 122 formed into the planar structure to define a passageway into the interior cavity of the replacement pad reservoir; and forms a linear path from removal of the sanding pad 198 from the sanding head 194 at the pad removal assembly 110 to retrieval of a mint (or "new") sanding pad 198 contained within the interior cavity of the replacement pad reservoir 120.

Accordingly, the system 100 can then: maneuver the sanding head 194 within the interior cavity of the replacement pad reservoir 120 via the aperture 122 to engage a set of sanding pads arranged within the replacement pad reservoir 120; and apply a target force at the sanding head 194 toward the set of sanding pads to couple a mint sanding pad 198, in the set of sanding pads within the replacement pad reservoir 120, to the sanding head 194, such as coupling via hook and loop fasteners between a first side of the mint sanding pad 198 and the interface pad 196 coupled to the sanding head 194. In this implementation, an operator interacting with the system 100 can routinely load the stack of sanding pads into the replacement pad reservoir 120 to maintain a supply of sanding pads at the replacement pad reservoir 120.

In one example, the system 100 includes the replacement pad reservoir 120 defining a cylindrical volume 121 configured to contain a set of sanding pads and includes a first radial aperture 122 arranged on a first end of the cylindrical volume 121. Additionally, the replacement pad reservoir 120 can further include: a platform 125 arranged within the cylindrical volume 121 at a second end, opposite the first end, and configured to vertically support the set of sanding pads within the replacement pad reservoir 120; and a spring element 126 arranged below the platform 125 and vertically supporting the platform 125 within the cylindrical volume 121. Furthermore, the system 100 can include a guide ring 128: arranged on the first end of the cylindrical volume 121 in alignment with the guide surface 114; and cooperating with the cylindrical volume 121 to form a passageway configured to guide the sanding head 194 toward the set of sanding pads 198 arranged within the cylindrical volume 121. In one variation of this example, the cylindrical volume 121 and the guide ring 128 can be formed of a molybdenum-disulfide filled nylon configured to reduce friction between the sanding head 194 and the replacement pad reservoir 120.

In the aforementioned example, during a tool change cycle, the system 100 can: maneuver the sanding head 194—absent a sanding pad 198 coupled to the interface pad 196—in concentric alignment over the aperture 122 of the replacement pad reservoir 120; and navigate the sanding head 194 within the interior cavity of the replacement pad reservoir 120 to engage the interface pad 196 of the sanding head 194 with the stack of sanding pads within the replacement pad reservoir 120.

In this example, the system 100 can execute canned cycles to navigate a sanding head 194 along a target path in order to: navigate the sanding head 194 along the target path across the pad removal assembly no to remove a worn sanding pad 198 from the sanding head 194; and, following removal of the worn sanding pad 198 from the sanding head 194, locate the sanding head 194 in concentric alignment with the aperture 122 of the replacement pad reservoir 120. The system 100 can then maneuver the sanding head 194 within the replacement pad reservoir 120 to engage the set of sanding pads within the replacement pad reservoir 120. In this example, the guide ring 128 and the cylindrical passageway of the replacement pad reservoir 120 cooperate to: horizontally constrain the sanding head 194 within the replacement pad reservoir 120; and maintain a target concentric pose of the sanding head 194, relative the set of sanding pads within replacement pad reservoir 120, to ensure concentric coupling between the interface pad 196 at the sanding head 194 and the mint sanding pad 198 within the replacement pad reservoir 120. Thus, the system 100 can then: maneuver the sanding head 194 through the guide ring 128 to locate the sanding head 194 within the replacement pad reservoir 120 to engage the set of sanding pads within the interior cavity; and apply a target force between the interface pad 196 at the sanding head 194 toward a mint sanding pad 198 within the interior cavity of the replacement pad reservoir 120 to couple the mint sanding pad 198 to the sanding head 194 (e.g., via hook and loop fastening mechanism).

In another example, the system 100 can: navigate the sanding head 194 proximal the aperture 122 of the replacement pad reservoir 120; and capture a first image from an optical sensor 132 arranged on the end effector 192 including the sanding head 194 and facing toward the aperture 122 of the replacement pad reservoir 120. In this example, the system 100 can then: extract a first set of features (e.g., edge detection) from the first image; and interpret a target pose of a mint sanding pad 198 depicted in the first image and located within the replacement pad reservoir 120. The system 100 can then: maneuver the sanding head 194 according to the target pose of the mint sanding pad 198 to concentrically align the sanding head 194 with the aperture 122 of the replacement pad reservoir 120; and subsequently navigate the sanding head 194 within the replacement pad reservoir 120 to retrieve a mint sanding pad 198 within the replacement pad reservoir 120.

Therefore, the system 100 can execute a tool change cycle to: maneuver a sanding head 194 over the replacement pad reservoir 120 containing a set of sanding pads configured to couple the sanding head 194; and navigate the sanding head 194 within the replacement pad reservoir 120 to maintain a target concentric pose during coupling of a mint sanding pad 198 within the replacement pad reservoir 120 and the interface pad 196 at the sanding head 194.

In another example, the replacement pad reservoir 120 defines a continuous cylinder (e.g., rather than axial-rods) forming a low clearance configured to concentrically locate the sanding head 194 within the replacement pad reservoir 120 during the tool change cycle. The replacement pad reservoir 120 further includes a lead-in chamber: arranged at a top end of the replacement pad reservoir 120 via bearings (e.g., free-rolling bearings); and configured to concentrically locate and align the sanding head 194 over the aperture 122 of the replacement pad reservoir 120. Additionally, the replacement pad reservoir 120 defines a smooth and continuous interior surface that cooperates with the lead-in chamber to form a low clearance configured to align the sanding head 194 traversing within the replacement pad reservoir 120. Thus, the sanding head 194 concentrically aligns within the replacement pad reservoir 120 during the tool change cycle. Furthermore, the replacement pad reservoir 120 includes an adjustable base configured to locate the sanding pads within the replacement pad reservoir 120 to a target vertical height.

3.4 Inspection Unit

Generally, the system 100 can include an inspection unit 130 including: an optical sensor 132 (e.g., color camera) defining a field of view of an imaging plane arranged opposite the guide surface 114; and a lighting module configured to output light toward the imaging plane at a particular angle or incidence (e.g., between parallel to the imaging plane or normal to the imaging plane). In particular, the system 100 can include an enclosure: arranged adjacent (e.g., coupled to) the replacement pad reservoir 120 containing the set of sanding pads; and locating the optical sensor 132 to define a field of view upward from the guide surface 114. Thus, the system 100 can: navigate the sanding head 194 proximal the optical sensor 132 to locate the sanding pad 198 arranged on the sanding head 194 within a field of the view of the optical sensor 132; trigger the lighting module to illuminate an abrasive area of the sanding pad 198; and trigger the optical sensor 132 to capture an image depicting the abrasive area of the sanding pad 198 prior to executing a tool change cycle at the pad removal assembly no and the replacement pad reservoir 120.

3.4.1 Inspection Unit: Optical Sensor

In one implementation, the inspection unit 130 is transiently coupled to the replacement pad reservoir 120 and includes an optical sensor 132 defining a field of view directed toward an imaging plane defined by the sanding head 194 arranged over the optical sensor 132. Generally, the inspection unit 130 is configured to transiently (i.e., removably) couple to the replacement pad reservoir 120 and includes an optical sensor 132 configured to record an image of abrasive surfaces of a sanding pad 198 of a sanding head 194 arranged over the inspection unit 130. For example, the optical sensor 132 can include: an area imaging sensor, such as an RGB or infrared, color or monochromatic, CMOS, CCD, or other camera configured to capture images (e.g., digital photographic color images) of sanding pads facing the optical sensor 132. The optical sensor 132 can additionally or alternatively include: a 3D imaging sensor, such as stereoscopic cameras, a structured light imaging system 100, or other depth sensor (e.g., an infrared depth camera) configured to output depth images, such as in the form of 3D point cloud images. Furthermore, the optical sensor 132 can include a lens focused to the image plane, defining the field of view including the net module, and defining a viewing axis perpendicular to the imaging plane.

However, the inspection unit 130 can include one or more sensors of any other type. For example, the inspection unit 130 can include an electronic test instrument (e.g., an oscilloscope and probes, profilometer), a surface profile station including a CNC surface profile gauge, or any other optical, acoustic, thermal, or other type of contact or non-contact sensor. (Alternatively, the system 100 can include one or more sensors, sensor actuators, etc. distributed across multiple modules.) The inspection unit 130 can further include a data bus configured to offload these images and/or other sensor data from the optical sensor 132—such as to a remote database, to the controller 180, or to a connected computing device (e.g., a laptop computer)—and the inspection unit 130 can further house the controller 180 as described below.

3.4.2 Inspection Unit: Lighting Modules

The system 100 further includes lighting modules configured to project artificial light proximal the imaging plane and to illuminate abrasive surfaces across a sanding pad 198 of the sanding head 194 within a field of view of the optical sensor 132 in preparation for recording an image of the unit at the inspection unit 130. In particular, the system 100 can include one or more dark-field lighting modules 138 configured to mount to the side of the enclosure or to the side of the replacement pad reservoir 120 and to illuminate surfaces of a sanding pad 198 located on the sanding pad 198 at substantially high angles of incidence (e.g., 90°+/−5°) relative to the viewing axis of the optical sensor 132 in preparation for recording a dark-field image, which can be particularly suitable for detecting defects (e.g., scratches, nicks, abrasions, tool marks, depressions, burrs, etc.) on illuminated surfaces of the abrasive area of the sanding pad 198. The system 100 can also include one or more bright-field lighting modules 136 configured to mount over the imaging volume, such as within the inspection unit 130, and to illuminate surfaces of the abrasive area of a sanding pad 198 located on the sanding head 194 at substantially low angles of incidence (e.g., 0°+/−10°) relative to the viewing axis of the optical sensor 132 in preparation for recording a bright-field image particularly suitable for detecting features on an abrasive area of the sanding pad 198, which can enable relatively accurate extraction of quantitative dimensions of these features of the sanding pad 198. The system 100 can further include a side lighting module: arranged vertically between a dark-field lighting module 138 adjacent the replacement pad reservoir 120 and the bright-field lighting module 136; and including a side light source configured to project light onto a surface of interest on an abrasive area of a sanding pad 198 at (predominantly) an angle between light output (predominantly) by the dark-field lighting module 138 and light output (predominantly) by the bright-field lighting module 136.

3.4.2.1 Dark-Field Lighting Module

In one implementation, the dark-field lighting module 138: includes a dark-field light source configured to output light across a light plane; includes a directional light filter extending across the dark-field light source, configured to pass light output by the dark-field light source substantially normal to the light plane, and configured to reject light output by the dark-field light source substantially nonparallel to the light plane; and is configured to transiently couple to the enclosure proximal the replacement pad reservoir 120 with a normal axis of the light plane substantially perpendicular to the abrasive area of the sanding pad 198 arranged on the sanding head 194.

In the aforementioned implementation, the dark-field lighting module 138 includes a light source facing the open volume and configured to output light across a light plane. In particular, the dark-field light source of the dark-field lighting module 138 includes a grid array of light elements arranged across the light plane. For example, the light source can include: a set of cold-cathode fluorescent lamps (CCFLs) spanning the light plane; a two-dimensional array of LEDs spanning the light plane; or a planar light guide spanning the light plane and one or more rows and columns of LEDs arranged about the perimeter of the light guide. However, the light source can include any other light source type configured to output light across an area (e.g., the light plane) or cluster of light sources (e.g., point sources) that cooperate to output light across an area.

The dark-field lighting module 138 can include a directional light filter: coupled to the light source between the light source imaging plane; configured to pass light output from the light source substantially normal to the light plane; and configured to reject light output from the light source at angles other than substantially normal to the light plane. In particular, the directional light filter functions to limit the maximum angle between light rays passed from the light source into the imaging plane between the inspection unit 130 and the sanding head 194, thereby limiting the angle of incident light rays on the abrasive area of a sanding pad 198—facing the optical sensor 132—at a similarly narrow angular range.

3.4.2.2 Bright-Field Lighting Module

The system 100 can also include a bright-field lighting module 136 transiently coupled to the enclosure proximal the optical sensor 132 and including a bright-field light source configured to output light toward the surface of interest (e.g., toward the image plane and substantially parallel to the viewing axis of the optical sensor 132). Generally, a dark-field lighting module 138 described above can illuminate the width and breadth of an abrasive area of a sanding pad 198 with directional light of substantially uniform intensity but can wash out edges of the abrasive area or otherwise provide limited contrast across abrasive surfaces at different levels within the abrasive area of the sanding pad 198. The system 100 can also include a bright-field lighting module 136 that projects toward and substantially normal to the abrasive area of the sanding pad 198 in order to cast shadows between surfaces of different levels in the abrasive area of the sanding pad 198. The controller 180 (or a remote computer system 100) can then implement machine vision (e.g., edge detection) techniques to identify wear index within a bright-field image.

Therefore, the bright-field lighting module 136 can illuminate abrasive areas of a sanding pad 198 arranged on the sanding head 194 with greater contrast due to occurrence of shadows along edge features on the sanding head 194. In one implementation, the bright-field lighting module 136 includes a ring of LEDs arranged in a circular pattern about a substrate and configured to mount to the inspection unit 130, such as on the optical sensor 132 concentric with and behind the lens of the optical sensor 132. The bright-field lighting module 136 can also include a directional light filter—as described above—with aperture 122s coaxial with the viewing axis of the optical sensor 132 lens such that the bright-field lighting module 136 projects light rays substantially normal to the image plane and at a substantially uniform intensity across abrasive areas of a sanding pad 198 arranged on the sanding head 194.

2.4.2 Variation: Reflective Surfaces

In one variation, the system 100 includes the inspection unit 130: arranged on the robotic arm 190 proximal the sanding head 194 coupled to the end effector 192; including an optical sensor 132 defining a field of view of the sanding head 194 arranged on the end effector 192; and including a lighting module (e.g., bright-field lighting module 136) arranged on the inspection unit 130 and configured to output light normal the field of view defined by the optical sensor 132. In this variation, the system 100 further includes a reflecting surface (e.g., mirror): arranged in alignment with the guide surface 114; and configured to reflect light toward the optical sensor 132 arranged on the robotic arm 190.

Accordingly, the system 100 can then: navigate the sanding head 194 proximal the reflective surface to locate the sanding pad 198 arranged on the sanding head 194 within a field of view of the optical sensor 132 at the robotic arm 190; trigger the optical sensor 132 at the robotic arm 190 to capture an image depicting the sanding pad 198 in the reflective surface opposite the optical sensor 132 at the robotic arm 190; and implement steps and techniques described below to interpret an abrasive degradation of the sanding head 194 based on visual features extracted from the image.

Therefore, the system 100 can: leverage the suite of sensors (e.g., optical sensor 132, lighting module) arranged on the robotic arm 190 to capture images depicting abrasive areas of a sanding pad 198 arranged on the sanding head 194; and record images at the optical sensor 132 arranged on the robotic arm 190—depicting a reflective surface directed toward the sanding pad 198—to interpret abrasive degradation at the sanding pad 198. Accordingly, the system 100 can: reduce reliance on the inspection unit 130 arranged proximal the replacement pad reservoir 120; and implement reflective surfaces to leverage sensors located on the robotic arm 190 to capture images of abrasive areas on the sanding pad 198 arranged on the sanding head 194.

4. Workpiece Loading and Processing Inputs

In one variation, the system 100 retrieves processing inputs and/or other parameters for autonomously sanding the workpiece, such as once an operator loads the workpiece into the work zone adjacent the system 100.

In particular, in preparation for autonomously processing (e.g., sanding) a workpiece by the system 100, an operator locates the workpiece in the work zone adjacent to the system 100. For example, the operator may: load the workpiece onto a support rig (e.g., a wheeled table) and install intermittent clamps on the workpiece to retain the workpiece on the support rig; place the support rig and workpiece into the work zone; and lock wheels of the support rig.

4.1 Processing Limits

The system 100 can then prompt the operator to supply processing limits for the workpiece, such as including: a maximum applied force (i.e., a maximum force applied by the sanding head 194 to any region of the workpiece); a maximum applied pressure (e.g., a maximum force applied by the sanding head 194 to any unit area of the workpiece); and a maximum deformation of the workpiece (e.g., a maximum distance of a point on the workpiece in an unloaded position to a loaded position when the system 100 applies the sanding head 194 to the workpiece). For example, the operator can supply these processing limits based on known material properties and compliance characteristics of the workpiece.

Additionally or alternatively, the system 100 can retrieve these processing limits from a predefined processing profile. For example, the system 100 can select a predefined processing profile stored in a processing profile database based on: a material of the workpiece (e.g., fiberglass, steel, aluminum) and/or a nominal wall thickness of the workpiece selected by the operator; or a length, aspect ratio, and/or a geometry profile of the workpiece (e.g., concave with high aspect ratio, convex with high aspect ratio, concave with low aspect ratio, convex with low aspect ratio) entered by the operator or derived from a scan of the workpiece completed by the system 100. The system 100 can then load processing limits extracted from this processing profile.

4.2 Material Removal Targets

In another implementation, the system 100 prompts the operator to manually input properties of and/or processing targets for the workpiece (e.g., through a set of dropdown menus), such as: material type; coating type (e.g., none, gel coat, epoxy, primer, base coat, clear coat); target, maximum, and/or minimum material removal depth (e.g., 0.002" to 0.010"); and/or output surface quality (e.g., sanded to 80-, 150-, 220-, 320-, or 400-grit; buffed; polished). Alternatively, the system 100 can prompt the operator to select a material removal profile—such as from a set of material removal profiles stored in a processing database—containing these data.

The system 100 can then select a sanding pad 198 of a sanding grit corresponding to the target output surface quality and implement methods and techniques described below to generate a nominal toolpath and set a nominal target force for processing the workpiece based on: this sanding grit; the target, maximum, and/or minimum material removal depth; and/or a maximum applied force or pressure set for the workpiece.

However, the system 100 can retrieve or load processing limits for the workpiece based on any other data supplied by the operator or collected autonomously by the system 100 during a scan cycle as described below.

5. Workpiece Scan

Blocks S112, S110, and S120 of the method S100 recite: navigating an end effector 192 over a workpiece; accessing a set of images captured by an optical sensor 132 arranged on the end effector 192 while traversing the workpiece; and compiling the set of images into a virtual model representing unloaded surfaces of the workpiece. Generally, in Blocks S112, S110, and S120, the system 100 can implement methods and techniques described in U.S. patent application Ser. No. 18/111,470 to: autonomously navigate an optical sensor 132 (e.g., a depth sensor and/or a color camera) over the workpiece; capture optical images (e.g., depth maps, photographic color images) of the workpiece; and assemble these optical images into a virtual three-dimensional model that represents surfaces of the workpiece, as shown in FIG. 1.

For example, after the operator loads the workpiece into the work zone and confirms processing limits for the workpiece, the system 100 can initiate a scan cycle. During the scan cycle, the system 100 can: navigate the optical sensor 132—located on the end effector 192—along the scan path over and offset above the workpiece; monitor a distance between the end effector 192 and the workpiece based on depth data collected by the optical sensor 132; and implement closed-loop controls to maintain a target offset distance between the optical sensor 132 and the workpiece (e.g., 20", 50 centimeters). In this example, for a workpiece defining an elongated geometry including a long axis located approximately parallel to a longitudinal axis of the work zone, the system 100 can actuate a conveyor supporting the robotic arm 190 to traverse the robotic arm 190 along the longitudinal axis of the work zone while rastering the end effector 192 and the optical sensor 132 laterally across the work zone to capture a sequence of optical images representing all surfaces of the workpiece accessible by a sanding head 194 on the end effector 192.

The system 100 can thus capture scan data—such as color photographic images, stereoscopic images, two-dimensional infrared images, depth maps, and/or LIDAR images—from a set of optical sensor 132s arranged on the end effector 192 while traversing the end effector 192 across (e.g., over and not in contact with) the workpiece. For example, the system 100 can capture depth maps at a rate of 2 Hz while traversing the end effector 192 across the workpiece at a rate of three feet per second at a target offset distance of three feet between the end effector 192 and the workpiece, which corresponds to a nominal sensor field of view of three feet by three feet and thus yields approximately 50% overlap between consecutive depth maps captured by the system 100 during the scan cycle.

The system 100 then compiles these optical images into a virtual three-dimensional model of the workpiece as described in U.S. patent application Ser. No. 18/111,470, such as by implementing structure-from-motion techniques or by fusing these optical images into the virtual model based on poses of the robotic arm 190 when these optical images were captured. For example, the system 100 can compile this set of optical images into a three-dimensional mesh within a virtual three-dimensional space.

However, the system 100 can implement any other methods or techniques to navigate the end effector 192 and optical sensor 132 over the workpiece, to collect optical images of the workpiece, and to generate a virtual three-dimensional model of the workpiece based on these optical images.

6. Nominal Workpiece Segmentation

In one variation shown in FIG. 1, the system 100 segments the workpiece into workpiece regions. For example, the system 100 can segment the virtual model of the workpiece into: approximately-flat regions; concave regions; convex regions; workpiece perimeter regions; regions containing edges; and/or regions containing orifices or apertures. In another example, the system 100 can: define a first workpiece region containing a contiguous convex surface; define a second workpiece region containing a contiguous concave surface; and define a third workpiece region containing a contiguous surface approximating a planar geometry (e.g., defining a large effective radius); etc. In yet another example, the system 100 can: define a first contiguous workpiece region characterized by high detected, predicted, or annotated stiffness; define a second contiguous workpiece region characterized by moderate detected, predicted, or annotated stiffness; and define a third contiguous workpiece region characterized by low detected, predicted, or annotated stiffness; etc. In another example, the system 100 can project a predefined boundary grid onto the virtual model and define workpiece regions according to boundaries defined in this boundary grid.

In the foregoing examples, the system 100 can also define workpiece regions spanning target widths, lengths, and/or surfaces areas spanning less than maximum widths, lengths, and/or surfaces areas.

However, the system 100 can segment the workpiece in any other way and according to any other workpiece characteristics.

The system 100 can then define a toolpath, assign a target force, and set a feed rate of the sanding head 194 for each workpiece region.

7. Target Force Parameters

Block S142 of the method S100 recites: assigning a first target force to the first workpiece region. Generally, in Block S142, the system 100 assigns target forces to workpiece regions of the workpiece, such as: based on autonomously-detected, manually-indicated, or derived (e.g., interpolated) maximum compliance (or minimum stiffness) characteristics of these regions; based on geometries (e.g., concave and convex contours, profiles) in these regions of the workpiece; and/or based on a material or part type of the workpiece.

In one implementation, the system 100 retrieves a single nominal target force from the predefined processing profile described above and assigns this target force to the entire workpiece, as shown in FIG. 1.

In another implementation, the system 100 defines boundaries between contiguous regions of the workpiece exhibiting similar contours, such as between contiguous concave, convex, and approximately flat regions of the workpiece spanning more than a minimum surface area (e.g., four square feet). The system 100 then assigns target forces to each region, such as: highest forces in concave regions that may be least susceptible to plastic deformation due to high force application by the sanding head 194; moderate forces in flat regions that may be more susceptible to plastic deformation due to force application by the sanding head 194; lowest forces in convex regions that may be most susceptible to plastic deformation due to high force application by the sanding head 194; and/or force magnitudes within a region proportional to the smallest radius within the region. The system 100 can also annotate these regions and corresponding target forces in the virtual model of the workpiece.

Additionally or alternatively, the system 100 can retrieve or calculate a target nominal force for each region of the workpiece, such as: proportional to a detected or indicated stiffness in a workpiece region; or proportional to a minimum effective radius of the workpiece region.

8. Nominal Toolpath Generation

The system 100 can further implement methods and techniques described in U.S. patent application Ser. No. 18/111,470 to define a toolpath within each region of the workpiece.

In one implementation shown in FIG. 1, the system 100 sets a nominal target force—for application of the sanding head 194 on the workpiece—less than the maximum applied force and/or based on (e.g., inversely proportional to) an operator—indicated or system 100—derived stiffness of a region of the workpiece. The system 100 further: retrieves a function that relates contact duration (i.e., a time or rotation count of a sanding pad 198 in contact with a workpiece), applied force (or pressure), nominal sanding pad abrasiveness, and material removal depth; selects a nominal sanding pad abrasiveness for the workpiece based on an output surface quality selected for the workpiece by the operator; and calculates a nominal contact duration for the workpiece based on the nominal target force, the nominal sanding pad abrasiveness, and the target material removal depth.

The system 100 then sets or calculates a combination of pitch offset between legs of a toolpath (or "stepover distance") and a feed rate for the toolpath that yields the nominal contact duration. In particular, a higher feed rate may yield less contact time between the sanding head 194 and a unit area of the workpiece; and vice versa. Similarly, a wider stepover distance for the toolpath may yield less contact time between the sanding head 194 and a unit area of the workpiece; and vice versa. For example, the system 100 can set a feed rate and a stepover distance—inversely proportional to feed rate—based on feed rate preferences set by the operator. Alternatively, the system 100 can: set a lower feed rate and wider stepover distance for segments of a toolpath intersecting a region of the workpiece characterized by a large radius in which a large proportion of the sanding pad 198 is in contact with the workpiece; and set a higher feed rate and narrower stepover distance for segments of a toolpath intersecting a region of the workpiece characterized by a small radius in which a smaller proportion of the sanding pad 198 is in contact with the workpiece. The system 100 can therefore set or retrieve a nominal target force, a stepover distance, and a feed rate for each region of the workpiece.

The system 100 then generates a nominal toolpath for each region of the workpiece. In one implementation, the system 100: defines a serpentine or boustrophedonic toolpath within a first region of the workpiece according to a stepover distance set for the first workpiece region; and stores this first toolpath as a first set of keypoints, wherein each keypoint represents a vertex or other point on the toolpath, defines a three-dimensional position on the workpiece, includes a vector normal to the workpiece at this three-dimensional position, and is labeled with the target force and the feed rate set for the first region. More specifically, the system 100 can project the first toolpath onto the first region of the workpiece represented in the virtual model. The system 100 can then extract a three-dimensional position and normal vector of each vertex or other point on the first toolpath from the virtual model. Accordingly, the system 100 can store the first toolpath for the first workpiece region as a first ordered sequence of keypoints: located on a first surface of the workpiece stored in (i.e., represented by) the virtual model; and contained within the first workpiece region.

In one variation, the system 100 can iteratively adjust this first toolpath based on local radii of the workpiece along segments of the first toolpath. Additionally or alternatively, the system 100 can adjust target forces assigned to segments of the first toolpath: proportional to local radii of convex subregions of the workpiece adjacent these toolpath segments; and inversely proportional to radii of concave subregions of the workpiece adjacent these toolpath segments. Accordingly, the system 100 can set a force greater than the nominal target force within a concave subregion of the workpiece and a target force less than the nominal target force within a convex subregion of the workpiece.

In one example, the system 100 accesses an abrasive specification (or "abrasiveness," "grit") of a sanding pad 198 and a target material removal depth from the workpiece, such as selected by the operator directly, extracted from a processing profile selected by the operator, or selected autonomously by the system 100 as described above. The system 100 then: sets or calculates a first target force for a first region of the workpiece based on the abrasive specification of the sanding pad 198 and proportional to the target material removal depth for the workpiece; sets or calculates a first target stepover distance for the first region of the workpiece based on the abrasive specification of the sanding pad 198, inversely proportional to the target material removal depth for the workpiece, and proportional to the first target force; calculates a feed rate for the first workpiece region proportional to the first target force and inversely proportional to the target material removal depth for the workpiece; generates a first toolpath defining a boustrophedonic pattern—characterized by the first stepover distance—for the first workpiece region based on a geometry of contour of the first workpiece region represented in the virtual model; and assigns the first target force and the first feed rate to the first toolpath.

The system 100 can repeat the foregoing process(es) for each other region of the workpiece.

Alternatively, the system 100 can implement the foregoing methods and techniques to generate a single continuous toolpath spanning the entire workpiece or spanning another partial or complete surface of the workpiece selected for autonomous processing by the system 100.

9. Nominal Processing Cycle

Block S150 of the method S100 recites accessing a first sequence of force values output by a force sensor 199 coupled to a sanding head 194 arranged on the end effector 192. Blocks S152 and S154 of the method S100 recite, via a set of actuators coupled to the end effector 192: navigating the sanding head 194 across the first workpiece region according to the first toolpath; and, based on the first sequence of force values, deviating the sanding head 194 from the first toolpath to maintain forces of the sanding head 194 on the first workpiece region proximal the first target force.

Generally, in Blocks S150, S152, and S154, the system 100 can implement methods and techniques described in U.S. patent application Ser. No. 18/111,470 to autonomously navigate the sanding head 194 along a toolpath (e.g., a sequence of keypoints) defined within a region of the workpiece and to maintain a target normal force between the sanding head 194 and the workpiece by selectively moving the sanding head 194 into and away from the workpiece normal to the surface of the workpiece represented in the virtual model, as shown in FIG. 2.

The system 100 also implements closed-loop controls to maintain a target force between the sanding head 194 and the workpiece within each workpiece region—based on force values read from the force sensor 199 integrated into the sanding head 194—by driving the sanding head 194 toward and away from the workpiece along vectors normal to the workpiece, such as represented in keypoints of these toolpaths or extracted from the virtual model during the processing cycle. For example, for a first keypoint in the first ordered sequence of keypoints, the system 100 can drive the set of actuators to: locate the sanding head 194 at a first three-dimensional position intersecting the first keypoint; align an axis of the sanding head 194 to a first vector contained in the first keypoint; and drive the sanding head 194, coaxial with the first vector, toward the workpiece to match force values, in a sequence of force values read from the force sensor 199 in the sanding head 194, to a first target force assigned to a first toolpath containing the first keypoint. The system 100 can then drive the set of actuators to interpolate a three-dimensional path and sanding head 194 orientation from the first keypoint to the second keypoint while implementing closed-loop controls to apply the sanding head 194 to the workpiece with the first target force. The system 100 can repeat this process for each other keypoint defined along the first toolpath and then along subsequent toolpaths defined for other regions of the workpiece.

In a similar implementation, in Block S140, the system 100 defines a first ordered sequence of keypoints located on the virtual model. For each keypoint in the first ordered sequence of keypoints, the system 100: calculates a vector normal to the virtual model at a location of the keypoint on the virtual model; and stores the vector in the keypoint. The system 100 then stores the first ordered sequence of keypoints as the first toolpath. Then, for a first keypoint in the first ordered sequence of keypoints, the system 100: locates the sanding head 194 at a first position intersecting the first keypoint in Block S152; aligns an axis of the sanding head 194 to a first vector contained in the first keypoint; and drives the sanding head 194, coaxial with the first vector, toward the workpiece to match force values, in the first sequence of force values read from the force sensor 199, to the first target force in Block S154.

10. Wear Function

Block S160 of the method S100 recites accessing a wear model representing abrasive degradation of a sanding pad 198 arranged on a sanding head 194. Generally, in Block S160, the system 100 can retrieve a parametric function (or "model") that predicts real-time abrasiveness of an area on a sanding pad 198, such as based on: an initial or baseline abrasiveness (or "grit") of the sanding head 194; a force applied by the area of the sanding pad 198 to the workpiece over time; a quantity of revolutions made by the area of the sanding pad 198 while in contact with the workpiece; a distance traversed by the area of the sanding pad 198 while in contact with the workpiece; a duration of time that the area of the sanding pad 198 has been in contact with the workpiece; a hardness of a material on the surface of the workpiece; and/or an abrasive loading (or "clogging") tendency of the material on the surface of the workpiece; etc.

In particular, prior to application on the workpiece during a processing cycle, a sanding pad 198 may exhibit an initial (or "baseline," "nominal," or "starting") abrasiveness that corresponds to an initial cutting capacity of the sanding pad 198, such as represented by a "grit" value corresponding to a coarseness of the sanding pad 198. For example, lower grit values (e.g., "40," "60") represent coarser abrasives that may remove larger amounts of material per rotation or application duration. Conversely, higher grit values (e.g., "320," "1500") represent finer abrasives that may remove lesser amounts of material per rotation or application duration. However, a sanding pad 198 may degrade in effective cutting capacity and thus decrease in effective abrasiveness during a processing cycle, such as due to wear of the sanding pad 198 and/or due to "clogging" of the sanding pad 198 by material removed from a workpiece by the sanding pad 198.

Therefore, the system 100 can access and implement a wear function that predicts degradation (e.g., change in effective abrasiveness) of a unit area of a sanding pad 198 as a function of: the initial abrasiveness of the sanding pad 198; contact characteristics between the unit area of the sanding pad 198 and a workpiece (e.g., applied force, contact duration, contact distance, contact rotation count, surface speed); and/or characteristics of the workpiece (e.g., abrasive loading tendency, hardness). Accordingly, the system 100 can implement this wear function to estimate effective abrasiveness of the whole sanding pad or individual areas of the sanding pad 198 over time throughout a processing cycle.

For example, the wear function can include a parametric model that relates initial abrasiveness, variable contact characteristics described below, and fixed workpiece characteristics (or "inputs") to an effective abrasiveness of the sanding pad 198 (or an "output"). In another example, the wear function can include a neural network, and the system 100 can implement the wear function and artificial intelligence techniques to estimate the effective abrasiveness of the sanding pad 198 based on initial abrasiveness, contact characteristic, and workpiece characteristic data.

10.1 Sanding Pad Annular Areas

The system 100 can implement the wear function to predict an effective abrasiveness across an entire area of the sanding pad 198 during a processing cycle.

Alternatively and as shown in FIG. 2, the system 100 can: represent the sanding pad 198 as an array of (e.g., two, ten, 1,000) concentric annular areas (or "annuli") rotating about a common axis of the sanding head 194; and implement the wear function to predict an effect abrasiveness of each annular area of the sanding pad 198 during a processing cycle.

More specifically, the system 100 can implement the wear function and contact characteristics of each annular area of the sanding pad 198 during the processing cycle to estimate effective abrasiveness of individual, discrete areas on the sanding pad 198. Furthermore, each annular area of the sanding pad 198 may: carry different forces into the workpiece based on local contours of the workpiece and compliance of a backing between the sanding pad 198 and the sanding head 194; may move across the surface of the workpiece at different surface speeds based on a radial distance of the annular area from an rotational axis of the sanding head 194; and may contact the workpiece over different time durations based on local contours of the workpiece. Accordingly, the system 100 can track contact characteristics for these individual annular areas and update abrasiveness estimates for these individual annular areas accordingly during a processing cycle.

For example, during operation of the sanding head 194, each annular area on the sanding pad 198 may exhibit a different linear surface speed on the workpiece (i.e., based on effective radius of the annular area and the rotational speed of the sanding head 194). Similarly, during operation of the sanding head 194, each annular area on the sanding pad 198 may carry a different proportion of the total force— of the sanding head 194 on the workpiece—into the workpiece based on a local contour (or "shape," "geometry") of the workpiece in contact with the sanding pad 198, which may be represented in the virtual model. The system 100 can therefore monitor contact characteristics input for individual annular areas of the sanding pad 198 and input these contact characteristics into the wear function to estimate effective abrasiveness of each annular area of the sanding pad 198 during a processing cycle.

In similar variations, the system 100 can: define nested elliptical annular areas on a sanding pad 198 arranged on an orbital sander or define a column of rectangular areas on a sanding pad 198 arranged on a linear vibratory sanding head 194; and implement methods and techniques described herein to predict or monitor effective abrasiveness of these areas of such sanding pads based on motion of the sanding head 194 and the robotic arm 190.

11. Wear Prediction

Blocks S162 and S164 of the method S100 recite: accessing a first sequence of contact characteristics representing contact between a first abrasive area on the sanding pad 198 and the workpiece; and estimating a first abrasive degradation of the first abrasive area based on the wear model and the first sequence of contact characteristics. Generally, in Blocks S162 and S164, the system 100 can track contact characteristics for an area of the sanding pad 198 and insert these contact characteristics into the wear function to estimate a current abrasiveness of this area of the wear function, respectively, as shown in FIG. 2.

11.1 Rotation Count

In one implementation, the wear function outputs an abrasiveness of an area of a sanding pad 198 as a function of count of rotations of the area of the sanding pad 198 while in contact with the workpiece. For example, the wear function can output an abrasiveness of an area of a sanding pad 198 as a function of: the initial abrasiveness of the sanding pad 198; less a product of abrasive loading tendency of the workpiece and force applied to the workpiece by the sanding pad 198 area, integrated over count of rotations of the sanding head 194.

In one implementation, the system 100 can estimate a total area of the sanding pad 198 in contact with the workpiece during a rotation of the sanding pad 198 based on a local geometry of the workpiece adjacent the sanding pad 198, as stored in the virtual model, and an orientation of the sanding head 194 on the workpiece. The system 100 can then estimate a proportion of the total force—applied by the sanding pad 198 to the workpiece—carried by the discrete area of the sanding pad 198 during the rotation of the sanding pad 198 based on the local geometry of the workpiece.

For example, the system 100 can estimate: a higher proportion of the total applied force for an outermost annular area on the sanding pad 198 applied to a concave region of the workpiece; a higher proportion of the total applied force for an innermost annular area on the sanding pad 198 applied to a convex region of the workpiece; a lower proportion of the total applied force for an innermost annular area on the sanding pad 198 applied to a concave region of the workpiece; and a lower proportion of the total applied force for an outermost annular area on the sanding pad 198 applied to a convex region of the workpiece. The system 100 then: calculates a combination of these forces and an abrasive loading factor of the workpiece surface material; integrates this combination by a count of rotations of the sanding head 194; and subtracts this result from a nominal or baseline abrasiveness of the sanding pad 198 to estimate a current abrasiveness of the abrasive area.

In another implementation, the system 100 detects contact between the workpiece and a first abrasive area (e.g., a first abrasive area) on the sanding pad 198 during a first sequence of rotations of the sanding pad 198 on the sanding head 194 based on: a position of the first abrasive area on the sanding pad 198; a first geometry of a first segment of the workpiece—adjacent the sanding head 194 during this first sequence of rotations—represented in the virtual model; a first orientation of the sanding head 194 relative to the first segment of the workpiece during the first sequence of rotations; and a first effective radius of the first abrasiveness area on the sanding pad 198. Then, in response to detecting contact between the workpiece and the first abrasive area during the first sequence of rotations, the system 100 generates a first contact characteristic that includes a first count of the first sequence of rotations corresponding to contact between the workpiece and the first abrasive area. The system 100 can also estimate a first force component—in a first sequence of force values—applied by the first abrasive area to the workpiece during the first sequence of rotations based on a ratio of the first abrasive area to a total area of the sanding pad 198 or to a total area of the sanding pad 198 in contact with the workpiece during the sequence of rotations. According to the wear model, the system 100 can estimate a first abrasive degradation of the first abrasive area during the first sequence of rotations: proportional to the first force component of the first sequence of force values output by the force sensor 199 during the first sequence of rotations; and proportional to the first count of the first sequence of rotations represented in the first contact characteristic. The system 100 can then subtract this first abrasive degradation from a store abrasiveness of the first abrasive area of the sanding pad 198 to calculate an updated abrasiveness estimate for the first abrasive area.

Furthermore, in this example, the system 100 can detect absence of contact between the workpiece and the first abrasive area during a second sequence of rotations of the sanding pad 198 on the sanding head 194 based on: the position of the first abrasive area on the sanding pad 198; a second geometry of a second segment of the workpiece—adjacent the sanding head 194 during this second sequence of rotations—represented in the virtual model; a second orientation of the sanding head 194 relative to the second segment of the workpiece during the second sequence of rotations; the first effective radius of the first abrasive area on the sanding pad 198. Then, in response to detecting absence of contact between the workpiece and the first abrasive area during the second sequence of rotations, the system 100: generates a second contact characteristic that includes a null count of rotations corresponding to contact between the workpiece and the first abrasive area; and estimates null (i.e., no) degradation of the first abrasive area during the second sequence of rotations based on the second contact characteristic and the wear model.

11.2 Contact Duration

In a similar implementation, the system 100 estimates an abrasiveness of an abrasive area on the sanding pad 198 based on a duration that the abrasive area is in contact with the workpiece. For example, the wear function can output an abrasiveness of an area of a sanding pad 198 as a function of: the initial abrasiveness of the sanding pad 198; less a product of abrasive loading tendency of the workpiece and force applied to the workpiece by the sanding pad 198 area, integrated over time.

In one example, the system 100 implements methods and techniques described above to detect contact between the workpiece and the first abrasive area during a first time period based on: a position of the first abrasive area on the sanding pad 198; a first geometry of a first segment of the workpiece, adjacent the sanding head 194 during the first time period, represented in the virtual model; a first orientation of the sanding head 194 relative to the first segment of the workpiece during the first time period; and/or a first effective radius of the first annular area on the sanding pad 198. The system 100 can also implement methods and techniques described above to estimate a first force component applied by the first abrasive area to the workpiece during the first time period, such as based on a ratio of the first abrasive area to a total area of the sanding pad 198. Then, in response to detecting contact between the workpiece and the first abrasive area during the first time period, the system 100 generates a first contact characteristic that represents a first duration of the first time period. Based on the wear model, the system 100 then estimates a first abrasive degradation of the first abrasive area during the first time period: proportional to a first sequence of force values output by the force sensor 199 during the first time period; and proportional to the first duration of the first time period represented in the first contact characteristic. For example, the system 100 can estimate the first abrasive degradation of the first abrasive area during the first time period based on an integral of the first force component over the first duration.

11.3 Surface Speed

In yet another implementation, the system 100 estimates a change in abrasiveness of an abrasive area of the sanding pad 198 based on a combination of a force applied by the abrasive area to the workpiece and a speed of the abrasive area moving across the workpiece, integrated over time. For example, the system 100 can calculate a speed of the abrasive area based on a combination of: a rotational speed of the sanding head 194 multiplied by an effective radius of the abrasive area; and a linear speed of the sanding head 194 moving across the workpiece.

However, the system 100 can: track any other contact characteristics of the sanding pad 198—of the abrasive area more specifically—in contact with the workpiece; and/or implement any other method or technique to estimate the current abrasiveness or change in abrasiveness of an abrasive area on the sanding pad 198.

The system 100 can also execute the foregoing processes for each discrete abrasive area on the sanding pad 198 during the processing cycle.

12. Real-Time Processing Parameter Adjustment

One variation of the method S100 shown in FIGS. 3 and 4 includes Block S180, which recites modifying the first set of processing parameters based on the first abrasive degradation. Generally, in Block S180, the system 100 can modify processing parameters for the workpiece—such as target force, feed rate, toolpath stepover distance, and/or sanding head 194 orientation relative to the workpiece—in real-time during the processing cycle based on abrasive degradation across the sanding pad 198.

12.1 Target Force

In one implementation shown in FIG. 3, during the processing cycle, the system 100 can increase a target force assigned to a workpiece region proportional to the abrasive degradation of the sanding pad 198. More specifically, as the sanding pad 198 wears and thus yields reduced material removal, the system 100 can increase the target force applied by the sanding head 194 to the workpiece in order to maintain a (more) consistent material removal rate via the sanding pad 198 during the processing cycle.

For example, the system 100 can: set or access a target material removal rate from the workpiece during the processing cycle; and access a material removal model that associates abrasiveness, applied force, sanding head 194 rotation speed, feed rate, and/or workpiece surface material type to material removal rate (e.g., removal depth per unit time or removed material volume per unit time). The system 100 can then: calculate an effective abrasiveness of the sanding pad 198, such as a minimum or average abrasiveness of the array of abrasive areas of the sanding pad 198 described above; and implement the material removal model to calculate changes (e.g., increases) in target force predicted to yield the target material removal rate based on reduced effective abrasiveness of the sanding pad 198 over time. The system 100 can then implement closed-loop controls to apply the sanding head 194 to the workpiece according to this revised target force. The system 100 can also regularly revise this target force during the processing cycle, such as once per second.

In this example, the system 100 can therefore increase the target force assigned to a region of the workpiece proportional to abrasive degradation of the sanding pad 198. Furthermore, the system 100 can: access a force limit for the workpiece; and then pause the processing cycle for replacement of the sanding pad 198 in response to this updated target force approaching the force limit (i.e., in response to abrasiveness degradation of the sanding pad 198 requiring an increase in applied force—to maintain a consistent material removal rate—that approaches the force limit).

12.2 Feed Rate

Additionally or alternatively, the system 100 can decrease the feed rate—at which the system 100 traverses the sanding head 194 across the workpiece—proportional to abrasive degradation of the sanding pad 198.

For example, the system 100 can: retrieve a target material removal depth for the workpiece; calculate an effective abrasiveness of the sanding pad 198 throughout the processing cycle; and implement the material removal model described above to calculate changes (e.g., decreases) in feed rate predicted to yield the target material removal depth from the workpiece based on the reduced effective abrasiveness of the sanding pad 198. The system 100 can then navigate the sanding head 194 across the workpiece according to this revised feed rate.

The system 100 can also regularly revise this feed rate during the processing cycle, such as once per second.

12.3 Stepover+Toolpath

Additionally or alternatively, the system 100 can: decrease a toolpath stepover distance—between legs of the toolpath—proportional to abrasive degradation of the sanding pad 198; and recalculate the toolpath accordingly during the processing cycle.

For example, the system 100 can: retrieve a target material removal depth for the workpiece; calculate an effective abrasiveness of the sanding pad 198 throughout the processing cycle; and implement the material removal model described above to calculate a material removal rate from the workpiece based on the reduced effective abrasiveness of the sanding pad 198. The system 100 can then: calculate a reduced stepover distance between legs of the workpiece that yields overlapping areas of contact of the sanding pad 198 on the workpiece sufficient to yield the target material removal from the workpiece; implements methods and techniques described above to regenerate the toolpath—for the remaining unprocessed region of the workpiece—according to this revised stepover distance; and then transitions to traversing the sanding head 194 across the workpiece according to this revised toolpath.

The system 100 can also regularly revise the toolpath during the processing cycle, such as once per minute.

The system 100 can also execute the foregoing processing parameter adjustments concurrently, such as by: increasing the target force proportional to the abrasive degradation of the sanding pad 198; decreasing the feed rate of the sanding head 194 proportional to the abrasive degradation of the sanding pad 198; and decreasing the stepover distance of the toolpath proportional to the abrasive degradation of the sanding pad 198.

12.4 Sanding Head Effective Axis Offset

As shown in FIGS. 2 and 3, the system 100 can also implement closed-loop controls to modify a position and/or an orientation of the sanding head 194 relative to a local region of the workpiece, such as: to achieve consistent wear—and therefore consistent abrasiveness—across the entire sanding pad; to expose the local region of the workpiece to a more or less abrasive area of the sanding pad 198 for faster or slower material removal from this region of the workpiece; or to selectively localize wear to a first (e.g., center) area of the sanding pad 198 when processing a first (e.g., convex) region of the workpiece in order to preserve abrasiveness of a second (e.g., outer) area of the sanding pad 198 when processing a second (e.g., concave) region of the workpiece later during the processing cycle.

Generally and as described above, the system 100 can generate a toolpath containing a sequence of keypoints, each including: a three-dimensional point on a surface of the virtual model of the workpiece; and defining a three-dimensional vector normal to the virtual model at the three-dimensional point. Accordingly, during the processing cycle, the system 100 can: interpolate normal vectors between the vector contained at each keypoint; and navigate the sanding head 194 across the workpiece such that an effective axis of the sanding head 194 (e.g., a rotational axis of the sanding pad 198) is coaxial with the normal vector defined at each keypoint and each interpolated normal vector between these keypoints. In this variation, the system 100 can also linearly or rotationally offset the effective axis of the sanding head 194 from these normal vectors in order to shift contact between abrasive areas of the sanding pad 198 and the workpiece and thus control rates of wear within these abrasive areas of the sanding pad 198. For example, the system 100 can implement these methods and techniques when processing a convex region of the workpiece in order to preferentially increase wear across inner areas of the sanding pad 198 and maintain a higher effective abrasiveness in the other areas of the sanding pad 198 in preparation for subsequently processing a concave region of the workpiece.

In one implementation, the system 100 can generate the toolpath that includes a sequence of keypoints, wherein each keypoint defines a three-dimensional position on the virtual model and a vector normal to the three-dimensional position on the virtual model. During the processing cycle, the system 100 can: interpolate a subsequence of normal vectors between a first vector of a first keypoint and a second vector of a second keypoint in the sequence of keypoints; and navigate the sanding head 194 to the first keypoint. Furthermore, while navigating the sanding head 194 from the first keypoint to the second keypoint, the system 100 can: align the effective axis of the sanding head 194 coaxial with the subsequence of normal vectors; and translate the sanding head 194—parallel to the subsequence of normal vectors—to maintain forces of the sanding head 194 on the workpiece proximal the target force.

In this implementation, the system 100 can also implement methods and techniques described above to estimate a first abrasive degradation of a first annular area on the sanding pad 198 based on the wear model, a first sequence of contact characteristics representing contact between the first annular area and the workpiece, and a first effective radius of the first annular area. The system 100 can similarly implement methods and techniques described above to estimate a second abrasive degradation of a second annular area on the sanding pad 198—smaller than and nested within the first annular area—based on the wear model, a second sequence of contact characteristics representing contact between the second annular area and the workpiece, and a second effective radius of the second annular area less than the first effective radius.

12.4.1 Linear Offset

In this implementation, while navigating the sanding head 194 over a convex section of the workpiece during the processing cycle, the system 100 can increase a lateral offset between the effective axis of the sanding head 194 and the subsequence of normal vectors—and thus move the first, outer abrasive area of the sanding pad 198 into greater contact with the convex region of the workpiece than the second abrasive area—if the second abrasive degradation of the second abrasive area exceeds the first abrasive degradation of the first abrasive area. Conversely, the system 100 can decrease the lateral offset between the effective axis of the sanding head 194 and the subsequence of normal vectors—and thus move the second, inner abrasive area of the sanding pad 198 into greater contact with the convex region of the workpiece than the first abrasive area—if the first abrasive degradation of the first abrasive area exceeds the second abrasive degradation of the second abrasive area.

12.4.2 Linear Offset: Wear Lookahead

Similarly, while processing a convex section of the workpiece and before transitioning the sanding head 194 onto a concave section of the workpiece, the system 100 can decrease a lateral offset between the effective axis of the sanding head 194 and the subsequence of normal vectors, thereby: moving the second, inner abrasive area of the sanding pad 198 into greater contact with the convex region of the workpiece than the second abrasive area; increasing wear rate across the second abrasive area; and decreasing wear rate across the second abrasive area. The system 100 can then increase this lateral offset between the effective axis of the sanding head 194 and the subsequence of normal vectors while processing the concave section of the workpiece, thereby: engaging the first, outer abrasive area of the sanding pad 198 against the concave region of the workpiece; increasing material removal rate from the concave region of the workpiece.

12.4.2 Angular Offset

Additionally or alternatively, while navigating the sanding head 194 over a convex section of the workpiece during the processing cycle, the system 100 can increase an angular pitch offset between the effective axis of the sanding head 194 and the subsequence of normal vectors—and thus move the first, outer abrasive area of the sanding pad 198 into greater contact with the convex region of the workpiece than the second abrasive area—if the second abrasive degradation of the second abrasive area exceeds the first abrasive degradation of the first abrasive area. Conversely, the system 100 can decrease the angular pitch offset between the effective axis of the sanding head 194 and the subsequence of normal vectors—and thus move the second, inner abrasive area of the sanding pad 198 into greater contact with the convex region of the workpiece than the first abrasive area—if the first abrasive degradation of the first abrasive area exceeds the second abrasive degradation of the second abrasive area.

Similarly, while navigating the sanding head 194 over a concave section of the workpiece (e.g., a reverse-curve section) during the processing cycle, the system 100 can increase the angular pitch offset between the effective axis of the sanding head 194 and the subsequence of normal vectors—and thus move the first, outer abrasive area of the sanding pad 198 into greater contact with the convex region of the workpiece than the second abrasive area—if the second abrasive degradation of the second abrasive area exceeds the first abrasive degradation of the first abrasive area. Conversely, the system 100 can decrease the angular pitch offset between the effective axis of the sanding head 194 and the subsequence of normal vectors—and thus move the second, inner abrasive area of the sanding pad 198 into greater contact with the convex region of the workpiece than the first abrasive area—if the first abrasive degradation of the first abrasive area exceeds the second abrasive degradation of the second abrasive area.

12.4.4 Wear Balancing

The system 100 can implement the foregoing processes to deviate the effective axis of the sanding head 194 from normal vectors of the toolpath to balance abrasiveness degradation (or "wear") across many abrasive areas of the sanding pad 198 throughout the processing cycle, as shown in FIG. 3.

12.4.5 Linear+Angular Offset

The system 100 can also implement the foregoing processes to concurrently angularly and linearly deviate the effective axis of the sanding head 194 from normal vectors of the toolpath. For example, the system 100 can deviate the effective axis of the sanding head 194—from normal vectors through the workpiece—by angular and linear offsets that yield shortest total deviations from the toolpath and/or least overall motion for the robot.

12. Pad Replacement

Block S170 of the method S100 recites, in response to the first abrasive degradation exceeding a threshold degradation, pausing the processing cycle for replacement of the sanding head 194. Generally, in Block S170, the system 100 can pause the processing cycle and issue a prompt for manual replacement of the sanding pad 198 or issue a command for automatic replacement of the sanding pad 198 on the sanding head 194, such as: if the maximum or average abrasiveness degradation of the sanding pad 198 exceeds the sanding pad 198 wear threshold described above; if the minimum or average abrasiveness of the sanding pad 198 falls below a minimum abrasiveness; or if the effective abrasiveness of the sanding pad 198 diminishes to yield a material removal rate less than a threshold material removal rate.

In one implementation shown in FIG. 2, in response to the abrasive degradation of all or a portion of (e.g., an abrasive area, an annular area) the sanding pad 198 exceeding a threshold degradation, the system 100 can: generate a prompt to replace the sanding pad 198 on the sanding head

194; and serve the prompt to an operator, such as by rendering the prompt on a display adjacent the system 100 or by transmitting the prompt to a mobile device carried by the operator. Then, in response to confirmation of manual replacement of the sanding pad 198 on the sanding head 194—such as through the display or the mobile device—the system 100 can resume the processing cycle.

Alternatively, in response to the abrasive degradation of all or a portion of (e.g., an abrasive area, an annular area) the sanding pad 198 exceeding a threshold degradation, the system 100 can issue a sanding pad 198 replacement command to an autonomous tool changer adjacent or integrated into the system 100.

13.1 Wear Estimation Frequency+Display

Furthermore, the system 100 can regularly repeat the foregoing process to estimate an abrasiveness of abrasive area on the workpiece, such as at a refresh rate of once per second or one per minute during the processing cycle.

The system 100 can also render abrasive degradation of the whole sanding pad or discrete abrasive areas on the sanding pad 198 on a display arranged proximal the workpiece during the processing cycle. For example, the system 100 can interface with the display to: render a circular icon representing the workpiece; and render an annual gradient—representing current estimated abrasiveness—over the circular icon to visually indicate current estimated abrasiveness across the sanding pad 198.

12.2 Time to Sanding Pad Replacement

In one variation, the system 100 calculates a rate of abrasiveness degradation of the sanding pad 198 based on changes in abrasiveness of the whole sanding pad or discrete abrasive areas on the sanding pad 198 over time. The system 100 then extrapolates future abrasiveness degradation of the sanding pad 198 to predict a future time at which: the maximum or average abrasiveness degradation of the sanding pad 198 exceeds the sanding pad 198 wear threshold; the minimum or average abrasiveness of the sanding pad 198 falls below the minimum abrasiveness; or the effective abrasiveness of the sanding pad 198 diminishes to yield a material removal rate less than the threshold material removal rate.

In this variation, the system 100 can then: predict a time duration to this abrasiveness degradation limit; render this time duration on the display; and/or preemptively serve a prompt to replace the sanding pad 198 to an operator prior to the sanding pad 198 reaching this abrasiveness degradation limit in order to minimize processing cycle delays at the system 100.

14. Tool Change Cycle

Generally, the system 100 includes a controller 180, such as integrated within the inspection unit 130 coupled to the replacement pad reservoir 120 and/or arranged on a remote computer system 100 separate from the inspection unit 130, configured to: initiate an imaging routine to interpret abrasive degradation of an abrasive area for a sanding pad 198 depicted in an image captured at the optical sensor 132; and, in response to interpreting an abrasive degradation exceeding a threshold degradation for the sanding pad 198, execute a tool change cycle to remove a current sanding pad 198 from the sanding head 194 and subsequently load a mint (or "new") sanding pad 198 retrieved from the replacement pad reservoir 120. In particular the system 100 can, following a processing cycle corresponding to application of the sanding head 194 on a work piece proximal the work zone: navigate the sanding head 194 proximal the optical sensor 132; capture an image depicting an abrasive area of the sanding pad 198 arranged on the sanding head 194; and interpret an abrasive degradation for the sanding pad 198 at the sanding head 194 based on a set of visual features extracted from the image.

Thus, in response to the abrasive degradation for the sanding pad 198 exceeding a threshold deviation from a threshold degradation, the system 100 can: maneuver the sanding head 194 across the pad removal assembly no to remove the sanding pad 198 from the sanding head 194; and navigate the sanding head 194 within the replacement pad reservoir 120 to retrieve a mint (or "new") sanding pad 198 contained within the replacement pad reservoir 120. Accordingly, the system 100 can then initiate a second processing cycle corresponding to application of the sanding head 194—including the mint sanding pad 198—on the work piece proximal the work zone.

14.1 Imaging Routine

In one implementation, following a target time window during a processing cycle corresponding to application of the sanding head 194 on a work piece proximal the work area, the system 100 can: initiate an imaging routine to capture an image and/or a timeseries of images from the optical sensor 132 depicting an abrasive area at the sanding pad 198 arranged on the sanding head 194; and implement steps and techniques described below to interpret an abrasive degradation of the abrasive area of the sanding pad 198 based on visual features extracted from the image and/or timeseries of images. In particular, the system 100 can: at a first time, activate a set of lighting modules 134 (e.g., bright-lighting modules, dark-lighting modules) at the inspection unit 130 to illuminate the abrasive area of the sanding pad 198; and trigger the optical sensor 132 to capture an image and/or timeseries of images depicting the abrasive area of the sanding pad 198 at the first time during illumination of the abrasive area by the set of lighting modules 134. Accordingly, the system 100 can then: compute wear index using timeseries of images corresponding to the abrasive area of the sanding pad 198; and implement machine vision techniques to identify wear index within the image and/or time series of images based.

In one example, the system 100 can include a set of lighting modules 134 including a first lighting module including a bright-field light source and configured to output light normal the imaging plane. In this example, the system 100 can then execute an imaging routine to: retrieve a timeseries of images from the optical sensor 132 following a target time window during a processing cycle corresponding to application of the sanding head 194 on a work piece proximal the work zone; and detect presence of the sanding head 194 within a field of view of the optical sensor 132 in the timeseries of images. The system 100 can thus, in response to detecting presence of the sanding head 194 within a field of view of the optical sensor 132: at a first time, trigger the first lighting module, in the set of lighting modules 134, to illuminate the first abrasive area of the first sanding pad 198 at a first angle of incidence relative the first abrasive area; extract the first image, from the timeseries of images, depicting the first abrasive area of the first sanding pad 198 at the first time; and extract the first set of visual features from the first image. Accordingly, the system 100 can then interpret the first abrasive degradation of the first abrasive area of the first sanding pad 198 based on the first set of visual features from the first image.

In another example, the system 100 can include the set of lighting modules 134 including a second lighting module including a dark-field light source and configured to output light substantially parallel to the imaging plane. In this example, the system 100 can then, in response to detecting presence of the sanding head 194 within a field of view of the optical sensor 132: at a second time following the first time, trigger the second lighting module to illuminate the first abrasive area of the first sanding pad 198 at a second angle of incidence, different from the first angle of incidence, relative the first abrasive area; and extract a second image, from the timeseries of images, depicting the first abrasive area of the first sanding pad 198 at the second time. Accordingly, the system 100 can then: extract a second set of visual features from the second image; and interpret the first abrasive degradation of the first abrasive area of the first sanding pad 198 based on the first set of visual features from the first image and the second set of visual features from the second image.

Therefore, the system 100 can: trigger the lighting modules at the inspection unit 130 to illuminate the abrasive area across the sanding pad 198 arranged on the sanding head 194; extract wear index from the image corresponding to an abrasive area across the sanding pad 198 arranged on the sanding head 194; and trigger a tool change cycle in response to the wear index across the sanding pad 198 exceeding a threshold wear index.

14.2 Interpreting Abrasive Degradation

In one implementation, following a target time window in a processing cycle, the system 100 can: access a first image captured at the optical sensor 132 depicting an abrasive area of the sanding pad 198 arranged across the sanding head 194; extract a set of visual features from the first image; and generate a wear index representing degree of wear across the abrasive area depicted in the first image based on the first set of visual features. Accordingly, in response to the wear index for the abrasive area of the sanding pad 198 exceeding a threshold deviation from a nominal wear index, trigger a tool change cycle at the sanding head 194.

In one example, the system 100 includes an optical sensor 132 including an area imaging camera configured to capture color images of a sanding pad 198 arranged on the sanding head 194 within a field of view of the optical sensor 132. In this example, following a target time window during a processing cycle, the system 100 can then: navigate the sanding head 194 within the field of view of the optical sensor 132; trigger the optical sensor 132 to capture a first color image depicting the first sanding pad 198 arranged on the sanding head 194; and isolate a first region in the first color image corresponding to the first abrasive area of the first sanding pad 198. The system 100 can then: extract the first set of visual features from the first region; and generate a first pixel map including a set of pixels representing a first wear index across the first abrasive area based on the first set of visual features from the first region. The system can then interpret the first abrasive degradation based on differences between the first pixel map and a target pixel map representing a nominal wear index across the first abrasive area. Accordingly, in response to the first abrasive degradation exceeding a threshold degradation, the system 100 can then trigger the tool change cycle to remove the sanding pad 198 arranged on the sanding head 194 and load a mint (or "new") sanding pad 198 at the sanding head 194.

In another example, the system 100 includes an optical sensor 132 including a depth sensor configured to capture depth images of a sanding pad 198 arranged on the sanding head 194 within a field of view of the optical sensor 132. In this example, the system 100 can then: following a target time window during a processing cycle, navigate the sanding head 194 within the field of view of the depth sensor; trigger the depth sensor to capture a first depth image depicting the first sanding pad 198 arranged on the sanding head 194; and isolate a first region in the first depth image corresponding to the first abrasive area of the first sanding pad 198. The system 100 can then: extract a first set of visual features from the first region; and generate a first depth map including a set of pixels representing a first surface profile across the first abrasive area of the first sanding pad 198 based on the first set of visual features from the first region. The system can then interpret the first abrasive degradation across the first abrasive area based on differences between the first depth map and a target depth map representing a target surface profile across the first abrasive area.

Accordingly, in response to the first abrasive degradation exceeding a threshold degradation, the system 100 can then trigger a tool change cycle.

Therefore, the system 100 can: output a wear index for a sanding pad 198; and trigger a tool change cycle at the sanding head 194 responsive to the abrasion index exceeding a threshold deviation from a nominal value.

14.3 Tool Change Cycle

In one implementation, in response to the abrasive degradation across the abrasive area of the sanding pad 198 arranged on the sanding head 194 exceeding a threshold degradation, the system 100 can trigger a tool change cycle to: navigate the sanding head 194 across the guide surface 114 toward the separating element 112 to separate the sanding pad 198 from the interface pad 196 at the sanding head 194; and subsequently, navigate the sanding head 194 within the replacement pad reservoir 120 to engage a mint (or "new") sanding pad 198, in a set of sanding pads, located within the replacement pad reservoir 120.

In one example, during the tool change cycle, the system 100 can: at a first time, navigate the sanding head 194 to locate the first sanding pad 198 in abutting contact with the first guide surface 114; and maneuver the sanding head 194 along a linear path across the guide surface 114 toward a cutting edge 113 of the separating element 112 to separate the first sanding pad 198 from the sanding head 194 while guiding the first sanding pad 198 through the slot 116. In this example, the system 100 can then: at a second time following the first time, navigate the sanding head 194 over the aperture 122 of the replacement pad reservoir 120; and maneuver the sanding head 194 through the aperture 122 to apply a target force to the second sanding pad, in the set of sanding pads 124, contained within the replacement pad reservoir 120 to engage the second sanding pad at the sanding head 194. Thus, the system 100 can initiate a processing cycle corresponding to application of the sanding head 194 including the second sanding pad 198 on a workpiece proximal the work zone.

In another example, following a first time window during the processing cycle, the system 100 can: navigate the sanding head 194 including the second sanding pad 198 within the field of view of the optical sensor 132; trigger the optical sensor 132 to capture a second image depicting a second abrasive area of the second sanding pad 198 arranged on the sanding head 194; extract a second set of visual features form the second image; and interpret a second abrasive degradation for the second abrasive area in the second image based on the second set of features. The system 100 can then, in response to the second abrasive degradation falling below a target abrasive degradation, resume the processing cycle for a second time window according to the second abrasive degradation of the second sanding pad 198.

Therefore, during a processing cycle, the system 100 can: routinely (e.g., intervals of 30 minutes, 45 minutes) execute an imaging routine to derive an abrasive degradation across a sanding pad 198 arranged on the sanding head 194; and, in response to the abrasive degradation exceeding a threshold degradation, trigger a tool change cycle to replace the sanding pad 198 at the sanding head 194 and thereby maintain target abrasion contact during application of the sanding head 194 at a work piece.

14.4 Tool Installation Verification

In one implementation, following completion of the tool change cycle, the system 100 can execute a verification routine to confirm successful coupling of a mint (or "new") sanding pad 198 at the sanding head 194.

In one example, following the tool change cycle, the system 100 can: navigate the sanding head 194 including the second sanding pad 198 within the field of view of the optical sensor 132; trigger the optical sensor 132 to capture a second image depicting the second sanding pad 198 arranged on the sanding head 194; extract a second set of visual features from the second image; and interpret a second pose of the second sanding pad 198 arranged on the sanding head 194 based on the second set of features. Accordingly, in response to the second pose of the second sanding pad 198 exceeding a threshold deviation from a target pose, the system 100 can trigger a second tool change cycle to: navigate the sanding head 194 across the guide surface 114 toward the separating element 112 to remove the second sanding pad from the sanding head 194; and navigate the sanding head 194 within the replacement pad reservoir 120 to engage a third sanding pad, in the set of sanding pads 124, within the replacement pad reservoir 120 at the sanding head 194.

Therefore, following completion of a tool change cycle, the system 100 can: derive a pose of the mint sanding pad 198 at the sanding head 194; and, in response to the pose of the mint sanding pad 198 deviating from a target pose, initiate a second tool change cycle to mitigate incorrect application of the sanding head 194 on the work piece.

14.5 Generating Nominal Abrasion Threshold

In one implementation, prior to initialization of a processing cycle, the system 100 can: execute an initial imaging routine to generate a nominal abrasion threshold representing baseline abrasion of a sanding pad 198 arranged on the sanding head 194 prior to application of the sanding head 194 at a work piece; and implement the nominal abrasion threshold during imaging routines executed during the processing cycle.

In one example, during a set up period, the system 100 can: navigate the sanding head 194 proximal the optical sensor 132 to locate an initial abrasive area of an initial sanding pad 198 within a field of view of the optical sensor 132; record an initial image of the initial abrasive area at the optical sensor 132; and extract an initial set of visual features from the initial image. Accordingly, the system 100 can implement steps and techniques described above to: interpret an initial abrasion for the initial abrasive area of the initial sanding pad 198 based on the initial set of visual features; and store the initial abrasion as the nominal abrasion threshold within internal memory of the controller 180.

Therefore, prior to initializing a processing cycle the system 100 can: access the nominal abrasion threshold from internal memory; and implement the nominal abrasion threshold during an imaging routine following a target time window in the processing cycle.

15. Sanding Pad Checks

Blocks of the method S100 recite: accessing a sequence of torque values representing rotational forces, applied by the sanding head 194 to the workpiece, output by the force sensor 199 in Block S190; detecting torque values, in the sequence of torque values, exceeding a threshold deviation from a target torque in Block S192; interpreting the torque values exceeding the threshold deviation from the target torque as a failure condition (e.g., misalignment, incorrect grit specification) of the primary sanding pad 198 arranged on the sanding head 194 in Block S194; and, in response to interpreting the failure condition, pausing the processing cycle for inspection of the primary sanding pad 198 arranged on the sanding head 194 in Block S196.

Generally, in Blocks S190, S192, and S194, the system 100 can: read torque values (e.g., tangential torque values, normal torque values) output from the force sensor 199; detect an anomalous deviation of torque values (e.g., increase, decrease, oscillations, null), in the sequence of torque values, from a target torque (e.g., 1.5 newton-meters); and interpret this anomalous deviation of torque values as a failure condition (e.g., misalignment, detachment, grit specification error) of the primary sanding pad 198 on the sanding head 194 during the processing cycle. Thus, the system 100 can: in response to interpreting the failure condition of the primary sanding pad 198, pause the processing cycle; prompt an operator to inspect (or "check") the primary sanding pad 198 arranged on the sanding head 194 to replace and/or adjust the primary sanding pad 198 in order to resolve the failure condition; and, in response to confirmation of resolving the failure condition, resume the processing cycle.

15.1 Grit Error

In one implementation, the system 100 can access a set of processing parameters—for the workpiece—including: a target grit specification (e.g., 120 grit) for a primary sanding pad 198; and a target torque (e.g., 1.5 newton-meters) during application of the sanding head 194 to the workpiece. In this implementation, during the processing cycle, the system 100 can: detect a deviation (e.g., increase, decrease) of torque values (e.g., tangential torque values), in the sequence of torque values, exceeding a target torque (e.g., 1.5 newton-meters); and interpret the deviation of torque values (e.g., increase, decrease) from the target torque as the primary sanding pad 198 defining a grit specification deviating (e.g., +/−50 grit) from the target grit specification.

For example, the system 100 can: detect an increase in torque values (e.g., 2.5 newton-meters), in the sequence of torque values, exceeding the target torque (e.g., 1.5 newton-meters); and interpret this increase in torque values as the primary sanding pad 198—on the sanding head 194— defining a grit specification (e.g., 60 grit) falling less than the target grit specification (e.g., 120 grit). In another example, the system 100 can: detect a decrease in torque values (e.g., one newton-meters), in the sequence of torque values, exceeding the target torque (e.g., 1.5 newton-meters); and interpret this increase in torque values as the primary sanding pad 198—on the sanding head 194—defining a grit specification (e.g., 240 grit) exceeding the target grit specification (e.g., 120 grit).

The system 100 can then, in response to interpreting the primary sanding pad 198 as defining the grit specification (e.g., 60 grit) falling less than the target grit specification (e.g., 120 grit): pause the processing cycle; generate a prompt requesting an operator to replace the primary sanding pad 198 on the sanding head 194; and serve the prompt to the operator (e.g., to an operator device). Accordingly, in response to confirmation of replacement of the primary sanding pad 198 to the sanding head 194, the system 100 can then resume the processing cycle.

Therefore, the system 100 can: detect the primary sanding pad 198 on the sanding head 194 as defining a grit specification deviating from a target grit specification during the processing cycle; and pause the processing cycle for replacement of the primary sanding pad 198 on the sanding head 194 in order to prevent structural damage to the workpiece.

15.2 Sanding Pad Misalignment

In another implementation, during the processing cycle, the system 100 can: detect an oscillation of torque values (e.g., tangential torque values), in the sequence of torque values, exceeding a threshold amplitude (e.g., three newton-meters); and interpret the oscillation of torque values as a misalignment of the primary sanding pad 198 arranged on the sanding head 194. In this implementation, in response to interpreting the misalignment of the primary sanding pad 198 on the sanding head 194, the system 100 can: pause the processing cycle; generate a prompt requesting an operator to correct alignment of the primary sanding pad 198 on the sanding head 194; and serve the prompt to the operator (e.g., to an operator device).

Accordingly, in response to confirmation of corrected alignment of the primary sanding pad 198 to the sanding head 194, the system 100 can then resume the processing cycle. Therefore, the system 100 can: detect misalignment of the primary sanding pad 198 on the sanding head 194 during the processing cycle; and pause the processing cycle for alignment and/or replacement of the primary sanding pad 198 on the sanding head 194 in order to prevent structural damage to the workpiece and/or the sanding head 194.

15.3 Sanding Pad Detachment

In another implementation, during the processing cycle, the system 100 can: detect null values (e.g., zero torque output) in the sequence of torque values output from the force sensor 199; and interpret the null values as a detachment of the primary sanding pad 198 from the sanding head 194. In this implementation, in response to interpreting the detachment of the primary sanding pad 198 from the sanding head 194, the system 100 can: pause the processing cycle; generate a prompt requesting an operator to attach a secondary sanding pad to the sanding head 194 and/or to reattach the sanding head 194; and serve the prompt to the operator (e.g., to an operator device).

Accordingly, in response to confirmation of attachment of the secondary sanding pad to the sanding head 194, the system 100 can then resume the processing cycle. Therefore, the system 100 can: detect detachment of the primary sanding pad 198 from the sanding head 194 during the processing cycle; and pause the processing cycle for replacement of the primary sanding pad 198 on the sanding head 194 in order to prevent structural damage to the workpiece and/or the sanding head 194.

15.4 Validating Pad Removal

As described above, during the pad replacement cycle, the system 100 can navigate the sanding head 194 across the guide surface toward the separating element to remove the primary sanding pad 198 from the sanding head 194. In one implementation, following navigation of the sanding head 194 across the guide surface toward the separating element, the system 100 can: navigate the sanding head 194 within the imaging plane of the inspection unit 130 arranged proximal the work zone; access an image captured at the inspection unit 130 depicting the sanding head 194; extract a set of visual features from the image; and, based on the set of visual features, confirm successful removal of the primary sanding pad 198 from the sanding head 194. Accordingly, in response to confirming removal of the primary sanding pad 198 from the sanding head 194, the system 100 can navigate the sanding head 194 within the replacement pad reservoir 120 to couple a secondary sanding pad, in the set of sanding pads, within the replacement pad reservoir 120.

Alternatively, the system 100 can, based on the set of visual features: confirm unsuccessful removal of the primary sanding pad 198 from the sanding head 194; and repeat navigation of the sanding head 194 across the guide surface toward the separating element to remove the primary sanding pad 198 from the sanding head 194. Additionally or alternatively, the system 100 can generate a prompt requesting the operator to: manually remove the primary sanding pad 198 from the sanding head 194; and/or inspect the separating element (e.g., sharpness of the separating element, orientation of the separating element) of the pad removal assembly 110.

For example, during a pad replacement cycle, the system 100 can: navigate the sanding head 194 across the guide surface toward the separating element to remove the primary sanding pad 198 from the sanding head 194; navigate the sanding head 194 within the imaging plane of the inspection unit 130 arranged proximal the work zone; access an image captured by the inspection unit 130 depicting the sanding head 194 following removal of the primary sanding pad 198; extract a set of visual features from the image; based on the set of visual features, detect presence of an interface pad arranged on the sanding head 194; and, in response to detecting presence of the interface pad, confirm successful removal of the primary sanding pad 198 from the sanding head 194.

Therefore, the system 100 can confirm successful removal of the primary sanding pad 198 from the sanding head 194 in order to prevent clogging of the replacement pad reservoir 120 and misalignment of the set of sanding pads within the replacement pad reservoir 120 during navigation of the sanding head 194 within the replacement pad reservoir 120 to couple a secondary sanding pad, in the set of sanding pads, within the replacement pad reservoir 120.

15.5 Validating Successful Pad Replacement

In one implementation, following navigation of the sanding head 194 within the replacement pad reservoir 120 to couple to a secondary sanding pad—in the set of sanding pads—within the replacement pad reservoir 120, the system 100 can: navigate the sanding head 194 within the imaging plane of the inspection unit 130 proximal the work zone; access an image captured by the inspection unit 130 depicting the secondary sanding pad arranged on the sanding head 194; and, based on the image, confirm successful attachment of the secondary sanding pad on the sanding head 194.

For example, the system 100 can: access a target orientation of the secondary sanding pad on the sanding head 194, such as by accessing a visual representation depicting successful installation of a sanding pad on the sanding head 194; extract a set of visual features from the image depicting the secondary sanding pad on the sanding head 194; and, based on the set of visual features, derive an orientation of the secondary sanding pad arranged on the sanding head 194. The system 100 can then: in response to the orientation of the secondary sanding pad deviating from the target orientation, confirm unsuccessful attachment of the secondary sanding pad to the sanding head 194; and re-execute the pad replacement cycle to retry installation of a sanding pad to the sanding head 194.

Alternatively, the system 100 can: generate a prompt requesting an operator to manually correct attachment of the secondary sanding pad on the sanding head 194; and serve this prompt to the operator device associated with the operator.

In another example, in response to the orientation of the secondary sanding pad approximating the target orientation, the system 100 can: confirm successful attachment of the secondary sanding pad to the sanding head 194; and execute and/or resume a processing cycle for the workpiece.

Therefore, the system 100 can confirm successful installation of a secondary sanding pad on the sanding head 194 in order to prevent structural damage to a workpiece during a subsequent processing cycle resulting from absence of a sanding pad on the sanding head 194 and/or misalignment of a sanding pad on the sanding head 194.

15.6 Sanding Marks

In one implementation, following a processing cycle, the system 100 can: navigate an optical sensor 132—coupled to the set of actuators (e.g., robotic arm 190)—over the workpiece to define a field of view intersecting a processed region of the workpiece during the processing cycle; access an image captured by the optical sensor 132 depicting the processed region of the workpiece; extract a set of features from the image; and derive a set of surface finish characteristics (e.g., marks, reflectivity, thickness) of the processed region of the workpiece based on the set of features. Accordingly, the system 100 can then: detect a deviation of the set of surface finish characteristics from target surface finish characteristics; and, in response to the deviation exceeding a threshold deviation, predict an abrasive degradation of the primary sanding pad 198 on the sanding head 194 as exceeding a threshold abrasive degradation. The system 100 can then execute the pad replacement cycle to replace the primary sanding pad 198 on the sanding head 194 with a secondary sanding pad arranged within the replacement pad reservoir 120, as described above.

In one example, the system 100 can access a target set of surface finish characteristics for the workpiece including: a target surface reflectivity of the workpiece; a target sanding mark pattern across the workpiece; and a target coating thickness of the workpiece. The system 100 can then, following the processing cycle: via the set of actuators, navigate the optical sensor 132 over the workpiece to define the field of view intersecting a processed region of the workpiece; access an image captured by the optical sensor 132 depicting the processed region; extract a set of visual features from the image; and derive a primary set of surface finish characteristics of the processed region based on the set of visual features. The set of primary surface finish characteristics can include: a primary surface reflectivity (e.g., glossiness) of the processed region; a primary sanding mark pattern (e.g., waves) across the processed region; and a primary coating thickness of the processed region.

The system 100 can then: calculate a set of deviations between the primary surface reflectivity and the target surface reflectivity, the primary sanding mark pattern and the target sanding mark pattern, and the primary coating thickness and the target coating thickness; and predict abrasive degradation of the abrasive area on the primary sanding pad 198 based on the set of deviations. As described above, in response to the abrasive degradation exceeding a threshold degradation, the system 100 can then: generate a prompt requesting an operator to replace the primary sanding pad 198 arranged on the sanding head 194; and/or execute a pad replacement cycle to replace the primary sanding pad 198 arranged on the sanding head 194.

Therefore, the system 100 can concurrently: verify successful processing of the workpiece during a processing cycle; and predict abrasive degradation of an abrasive area on the primary sanding pad 198 arranged on the sanding head 194.

15.7 Estimated+Actual Abrasive Degradation

As described above, the system 100 can: estimate a primary abrasive degradation of the primary sanding pad 198 arranged on the sanding head 194; and, in response to the primary abrasive degradation exceeding the threshold degradation, pause the processing cycle.

In one implementation, following pause of the processing cycle, the system 100 can then: navigate the sanding head 194—including the primary sanding pad 198—within the imaging plane of the inspection unit 130; access an image captured by an optical sensor 132 at the inspection unit 130 and depicting the primary sanding pad 198; extract a set of visual features from the image; and calculate a secondary abrasive degradation of the primary sanding pad 198 based on the set of visual features as described above. Accordingly, the system 100 can then detect a deviation between the primary abrasive degradation (i.e., the estimated abrasive degradation) and the secondary abrasive degradation of the primary sanding pad 198 arranged on the sanding head 194.

For example, the system 100 can: generate a visual representation of the estimated primary abrasive degradation on the primary sanding pad 198, such as by generating an abrasion map depicting estimated abrasive degradation of the primary sanding pad 198; project the visual representation over the image of depicting the primary sanding pad 198 following pause of the processing cycle; and, based on differences between the visual representation of the estimated abrasive degradation of the primary sanding pad 198 and the image from the inspection unit 130 depicting the actual abrasive degradation of the primary sanding pad 198, calculate a deviation between the primary abrasive degradation and the second abrasive degradation.

In another example, the system 100 can: as described above, estimate a primary abrasiveness of the primary sanding pad 198 based on contact characteristics between the sanding head 194 and the workpiece during the processing cycle and a wear model; calculate a secondary abrasiveness of the primary sanding pad 198 based on the set of visual features extracted from the image depicting the primary sanding pad 198 arranged on the sanding head 194; and detect a deviation between the primary abrasiveness and the second abrasiveness.

Therefore, the system 100 can validate (or "check") that an estimated abrasive degradation of a primary sanding pad 198 arranged on the sanding head 194 approximates and/or deviates from an actual (or "real") abrasive degradation of the primary sanding pad 198.

15.7.1 Estimated+Actual Deviation: Modifying Parameters

In one implementation, the system 100 can then: detect a deviation between the secondary abrasive degradation and the primary abrasive degradation that exceeds a threshold deviation (e.g., +/−2 millimeters squared); and, in response to the deviation exceeding the threshold deviation, modify the set of parameters according to the difference in degradation between the primary abrasive degradation and the secondary abrasive degradation of the primary sanding pad 198 arranged on the sanding head 194. In this implementation, the system 100 can modify the set of processing parameters in order to maintain the estimated abrasive degradation proximal the actual abrasive degradation following replacement of the primary sanding pad 198 at the sanding head 194.

For example, in response to an increase in abrasive degradation between the first abrasive degradation and the second abrasive degradation, the system 100 can modify the set of processing parameters by decreasing the target force proportional to the increase in abrasive degradation between the primary abrasive degradation and the secondary abrasive degradation. In another example, in response to an increase in abrasive degradation between the first abrasive degradation and the second abrasive degradation, the system 100 can set a secondary threshold degradation, less than a primary threshold degradation, during a subsequent processing cycle following replacement of the primary sanding pad 198 arranged on the sanding head 194.

Therefore, following replacement of the primary sanding pad 198 arranged on the sanding head 194, the system 100 can estimate an abrasive degradation of the secondary sanding pad arranged on the sanding head 194 that approximates the actual abrasive degradation during the processing cycle.

15.8 Temperature Monitoring

In one implementation, the system 100 can include a temperature sensor: arranged within the sanding head 194; and configured to output temperature values of the sanding pad 198 coupled to the sanding head 198. Accordingly, the system can then: track temperature of the sanding pad 198 during application of the sanding head 194 on a workpiece; and pause application of the sanding head 194 to the workpiece in response to a temperature value output by the temperature sensor exceeding a threshold temperature (e.g., between. 160-250 degrees Fahrenheit).

The systems and methods described herein can be embodied and/or implemented at least in workpiece as a machine configured to receive a computer-readable medium storing computer-readable instructions. The instructions can be executed by computer-executable components integrated with the application, applet, host, server, network, website, communication service, communication interface, hardware/firmware/software elements of a user computer or mobile device, wristband, smartphone, or any suitable combination thereof. Other systems and methods of the embodiment can be embodied and/or implemented at least in workpiece as a machine configured to receive a computer-readable medium storing computer-readable instructions. The instructions can be executed by computer-executable components integrated by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor but any suitable dedicated hardware device can (alternatively or additionally) execute the instructions.

As a person skilled in the art will recognize from the previous detailed description and from the figures and claims, modifications and changes can be made to the embodiments of the invention without departing from the scope of this invention as defined in the following claims.

We claim:

1. A system comprising:
    a sanding head coupled to a set of actuators arranged adjacent a work zone;
    a force sensor:
        coupled to the sanding head; and
        configured to output a signal representing torque applied by the sanding head to a workpiece occupying the work zone;
    a controller configured to:
        during a first processing cycle:
            access a first sequence of torque values output by the force sensor;
            via the set of actuators, navigate the sanding head across the workpiece;
            detect a variation of torque values in the first sequence of torque values; and
            detect a misalignment of a first sanding pad on the sanding head based on the oscillation of torque values; and
        in response to detecting the misalignment of the first sanding pad, initiate a first pad replacement cycle for replacement of the first sanding pad on the sanding head.

2. The system of claim 1, wherein the controller is configured to:
    during a second processing cycle:
        access a second sequence of torque values output by the force sensor;
        detect an increase in torque values, in the second sequence of torque values, exceeding a threshold torque; and
        interpret a second sanding pad on the sanding head as exhibiting a grit specification falling below a target grit specification based on the increase in torque values; and
    in response to interpreting the second sanding pad as exhibiting the grit specification falling below the target grit specification:
        initiate a second pad replacement cycle for replacement of the second sanding pad on the sanding head; and
        during the second pad replacement cycle:
            pause the second processing cycle;
            generate a second prompt for replacement of the first second sanding pad arranged on the sanding head; and
            serve the second prompt to an operator; and
    in response to confirmation of replacement of the first second sanding pad on the sanding head, resume the second processing cycle.

3. The system of claim 1, wherein the controller is configured to:
    during a second processing cycle:
        access a second sequence of torque values output by the force sensor;
        detect a decrease in torque values, in the second sequence of torque values, falling less than a threshold torque; and
        interpret a second sanding pad on the sanding head as exhibiting a grit specification exceeding a target grit specification based on the decrease in torque values; and
    in response to interpreting the second sanding pad as exhibiting the grit specification exceeding the target grit specification:
        initiate a second pad replacement cycle for replacement of the second sanding pad on the sanding head; and
        during the second pad replacement cycle:
            pause the second processing cycle;
            generate a second prompt for replacement of the second sanding pad arranged on the sanding head; and
            serve the second prompt to an operator; and
    in response to confirmation of replacement of the second sanding pad on the sanding head, resume the second processing cycle.

4. The system of claim 1, wherein the controller is configured to:
    during a second processing cycle:
        access a second sequence of torque values output by the force sensor;
        detect null torque values in the second sequence of torque values; and interpret the null torque values as a detachment of a second sanding pad from the sanding head;
in response to interpreting the null torque values as the detachment of the second sanding pad from the sanding head:
pause the second processing cycle;
generate a second prompt requesting an operator to attach a third sanding pad to the sanding head; and
serve the second prompt to the operator; and
in response to confirmation of attachment of the third sanding pad to the sanding head, resume the processing cycle.

5. The system of claim 1:
further comprising an optical sensor:
arranged adjacent the work zone; and
defining a field of view directed toward an imaging plane; and
wherein the controller is configured to:
preceding the first processing cycle, navigate the sanding head within the imaging plane of the optical sensor;
access a color image recorded by the optical sensor depicting the first sanding pad arranged on the sanding head;
detect a color of the first sanding pad in the color image;
identify a grit specification associated with the first sanding pad based on the color;
in response to the grit specification deviating from a target grit specification:
generate a prompt requesting an operator to replace the first sanding pad arranged on the sanding head; and
serve the prompt to the operator; and
in response to confirmation of replacement of the first sanding pad, trigger the processing cycle.

6. The system of claim 1:
further comprising an optical sensor:
arranged adjacent the work zone; and
defining a field of view directed toward an imaging plane; and
wherein the controller is configured to:
calculate an abrasive degradation of the first sanding pad arranged on the sanding head;
in response to the abrasive degradation exceeding a threshold degradation, trigger a pad replacement cycle for replacement of the first sanding pad on the sanding head;
following the pad replacement cycle, navigate the sanding head within the imaging plane of the optical sensor;
access an image recorded by the optical sensor depicting a second sanding pad arranged on the sanding head;
detect a misalignment of the second sanding pad on the sanding head based on the image; and
in response to detecting the misalignment of the first sanding pad:
generate a prompt requesting an operator to correct alignment of the second sanding pad on the sanding head; and
serve the prompt to the operator.

7. The system of claim 1:
further comprising an optical sensor coupled to the set of actuators;
wherein the controller is configured to:
following the first processing cycle, via the set of actuators, navigate the optical sensor over a processed region of the workpiece;
access an image captured by the optical sensor and depicting the processed region of the workpiece;
extract a set of visual features from the first image;
derive a set of surface finish characteristics of the processed region of the workpiece based on the set of visual features; and
in response to the set of surface finish characteristics exceeding a threshold deviation from a target set of surface finish characteristics:
generate a prompt for replacement of a second sanding pad arranged on the sanding head; and
serve the prompt to an operator.

8. The system of claim 1, wherein the controller is configured to:
during the first processing cycle, generate a sequence of contact characteristics representing contact between the workpiece and the first sanding pad arranged on the sanding head;
calculate the abrasive degradation of the first sanding pad based on the sequence of contact characteristics; and
in response to the abrasive degradation exceeding a threshold degradation, trigger the first pad replacement cycle for replacement of the first sanding pad on the sanding head.

9. The system of claim 1:
further comprising an optical sensor:
arranged adjacent the work zone; and
defining a field of view directed toward an imaging plane; and
wherein the controller is configured to:
following the first processing cycle, navigate the sanding head within the imaging plane of the optical sensor;
access an image recorded by the optical sensor depicting a second sanding pad arranged on the sanding head;
extract a set of visual features from the first image;
calculate an abrasive degradation of the second sanding pad based on first set of visual features; and
in response to the abrasive degradation exceeding a threshold degradation, trigger the first pad replacement cycle for replacement of the second sanding pad on the sanding head.

10. The system of claim 1:
further comprising an inspection unit arranged adjacent the work zone and comprising:
an optical sensor defining a field of view directed toward an imaging plane;
a bright-field lighting module arranged adjacent the imaging plane and configured to output light normal to the imaging plane; and
a dark-field lighting module arranged adjacent the imaging plane and configured to output light substantially parallel to the imaging plane; and
wherein the controller is configured to:
at a first time, trigger the bright-field lighting module to illuminate the first sanding pad at a first angle of incidence relative the imaging plane;
access a first image, captured by the optical sensor, depicting the first sanding pad at the first time;
extract a first set of visual features from the first image;
at a second time following the first time, trigger the dark-field lighting module to illuminate the first sanding pad at a second angle of incidence, different from the first angle of incidence, relative the imaging plane;
    access a second image, captured by the optical sensor, depicting the first sanding pad at the second time; and
    calculate the abrasive degradation of the first sanding pad based on the first set of visual features and the second set of visual features.

11. The system of claim 1:
further comprising:
    a pad removal assembly comprising:
        a separating element arranged proximal a slot and configured to receive the first sanding pad coupled to the sanding head; and
        a guide surface arranged opposite the separating element and configured to guide the first sanding pad toward the separating element; and
    a replacement pad reservoir:
        arranged adjacent the separating element and housing a set of sanding pads configured to couple to the sanding head; and
        comprising an aperture in alignment with the guide surface and configured to receive the sanding head within the replacement pad reservoir; and
    wherein the controller is configured to:
        calculate an abrasive degradation of the first sanding pad arranged on the sanding head;
        in response to the abrasive degradation exceeding a threshold degradation, initiate the first pad replacement cycle for replacement of the first sanding pad arranged on the sanding head; and
        during the first pad replacement cycle:
            navigate the sanding head across the guide surface toward the separating element to remove the first sanding pad from the sanding head; and
            navigate the sanding head within the replacement pad reservoir to couple a second sanding pad, in the set of sanding pads, within the replacement pad reservoir to the sanding head.

12. The system of claim 11:
wherein the guide surface defines a rectangular region and comprises a ceramic coating across the guide surface configured to protect the guide surface from an abrasive area of the first sanding pad;
wherein the slot:
    extends across a first lateral side of the guide surface to define a channel interposed between the guide surface and the separating element; and
    defines a first edge proximal the guide surface and a second edge, opposite the first edge, proximal the separating element; and
wherein the separating element comprises a blade comprising:
    a spine coupled proximal the second edge of the slot; and
    a cutting edge, opposite the spine, partially extending across the channel and configured to receive the first sanding pad arranged on the sanding head and guide the first sanding pad within the slot during separation of the first sanding pad from the sanding head.

13. The system of claim 11, wherein the pad removal assembly further comprises a deflector pad:
arranged below the guide surface proximal the slot;
defining a vertical plane arranged normal to the guide surface; and
configured to maintain the first sanding pad in a vertical pose through the slot during separation of the first sanding pad from the sanding head.

14. The system of claim 11:
wherein the replacement pad reservoir defines a cylindrical volume configured to contain the set of sanding pads and comprises a radial aperture arranged on a first end of the cylindrical volume; and
wherein the replacement pad reservoir further comprises:
    a platform arranged within the replacement pad reservoir at a second end, opposite the first end, of the cylindrical volume and configured to vertically support the set of sanding pads within the replacement pad reservoir;
    a spring element arranged below the platform and vertically supporting the platform within the replacement pad reservoir; and
    a guide ring arranged on the first end of the replacement pad reservoir in alignment with the guide surface and cooperating with the cylindrical volume to form a passageway configured to guide the sanding head toward the set of sanding pads arranged within the replacement pad reservoir.

15. A system comprising:
a sanding head coupled to a set of actuators arranged adjacent a work zone;
a force sensor:
    coupled to the sanding head; and
    configured to output a signal representing torque applied by the sanding head to a workpiece occupying the work zone; and
a controller configured to:
    during a processing cycle:
        access a sequence of torque values output by the force sensor:
        via the set of actuators, navigate the sanding head across the workpiece;
        detect an increase in torque values, in the sequence of torque values, exceeding a threshold torque; and
        interpret a first sanding pad on the sanding head as exhibiting a grit specification falling below a target grit specification based on the increase in torque values; and
    in response to interpreting the first sanding pad as exhibiting the grit specification falling less than the target grit specification, initiate a first pad replacement cycle for replacement of the first sanding pad on the sanding head.

16. The system of claim 15:
further comprising an optical sensor:
    arranged adjacent the work zone; and
    defining a field of view directed toward an imaging plane; and
wherein the controller is configured to:
    in response to confirmation of replacement of the first sanding pad, navigate the sanding head within the imaging plane of the optical sensor;
    access a color image recorded by the optical sensor depicting a second sanding pad arranged on the sanding head;
    detect a color of the second sanding pad in the color image;
    identify a second grit specification associated with the second sanding pad based on the color; and in response to the second grit specification approximating the target grit specification, initiate a second processing cycle.

17. The system of claim 15:
further comprising an optical sensor:
  arranged adjacent the work zone; and
  defining a field of view directed toward an imaging plane; and
wherein the controller is configured to:
  following the processing cycle, navigate the sanding head within the imaging plane of the optical sensor;
  access an image recorded by the optical sensor depicting the first sanding pad arranged on the sanding head;
  extract a set of visual features from the first image;
  calculate an abrasive degradation of the first sanding pad based on first set of visual features; and
  in response to the abrasive degradation exceeding a threshold degradation, trigger the first pad replacement cycle for replacement of the first sanding pad arranged on the sanding head.

18. A system comprising:
a sanding head coupled to a set of actuators arranged adjacent a work zone;
a force sensor:
  coupled to the sanding head; and
  configured to output a signal representing torque applied by the sanding head to a workpiece occupying the work zone; and
a controller configured to:
  during a processing cycle:
    access a sequence of torque values output by the force sensor:
    via the set of actuators, navigate the sanding head across the workpiece;
    detect a decrease in torque values, in the sequence of torque values, falling less than a threshold torque; and
    interpret a first sanding pad on the sanding head as exhibiting a grit specification exceeding a target grit specification based on the decrease in torque values; and
  in response to interpreting the first sanding pad as exhibiting the grit specification exceeding the target grit specification, initiate a first pad replacement cycle for replacement of the first sanding pad on the sanding head.

19. The system of claim 18:
further comprising an optical sensor:
  arranged adjacent the work zone; and
  defining a field of view directed toward an imaging plane; and
wherein the controller is configured to:
  in response to confirmation of replacement of the first sanding pad, navigate the sanding head within the imaging plane of the optical sensor;
  access a color image recorded by the optical sensor depicting a second sanding pad arranged on the sanding head;
  detect a color of the second sanding pad in the color image;
  identify a second grit specification associated with the second sanding pad based on the color; and
  in response to the second grit approximating the target grit specification, initiate a second processing cycle.

* * * * *